US008089973B2

(12) United States Patent
Faska et al.

(10) Patent No.: US 8,089,973 B2
(45) Date of Patent: Jan. 3, 2012

(54) OUTDOOR HARDENED EXO-MODULAR AND MULTI-PHY SWITCH

(75) Inventors: Thomas S. Faska, Brookline, NH (US); Richard Stack, Amherst, NH (US); Charles A. Kaplan, Atlanta, GA (US)

(73) Assignee: Ciena Corporation, Linthicum, MD (US)

( * ) Notice: Subject to any disclaimer, the term of this patent is extended or adjusted under 35 U.S.C. 154(b) by 890 days.

(21) Appl. No.: 11/965,147

(22) Filed: Dec. 27, 2007

(65) Prior Publication Data
US 2008/0159256 A1 Jul. 3, 2008

Related U.S. Application Data

(60) Provisional application No. 60/877,296, filed on Dec. 27, 2006.

(51) Int. Cl.
*H02B 1/30* (2006.01)
*H04B 1/03* (2006.01)
*H04B 17/00* (2006.01)
*H04L 12/26* (2006.01)
*H04L 12/02* (2006.01)

(52) U.S. Cl. ............... 370/401; 361/600; 361/679.02; 361/730

(58) Field of Classification Search ............ 370/401; 361/600, 679.02, 724, 728, 730, 788, 797, 361/800; 714/4.12, 22
See application file for complete search history.

(56) References Cited

U.S. PATENT DOCUMENTS

| | | | | |
|---|---|---|---|---|
| 5,868,261 A * | 2/1999 | Collins et al. | ............... | 211/26 |
| 7,120,139 B1 * | 10/2006 | Kung et al. | ............... | 370/352 |
| 7,171,121 B1 * | 1/2007 | Skarica et al. | ............... | 398/67 |
| 7,623,537 B2 * | 11/2009 | Liva et al. | ............... | 370/419 |
| 7,686,520 B2 * | 3/2010 | Fingler et al. | ............... | 385/88 |
| 7,800,914 B2 * | 9/2010 | Dully | ............... | 361/756 |
| 2002/0006137 A1 * | 1/2002 | Rabenko et al. | ............... | 370/466 |
| 2003/0046706 A1 * | 3/2003 | Rakib | ............... | 725/111 |
| 2004/0057393 A1 * | 3/2004 | Bianchi et al. | ............... | 370/312 |
| 2005/0089027 A1 * | 4/2005 | Colton | ............... | 370/380 |
| 2006/0190739 A1 * | 8/2006 | Soffer | ............... | 713/189 |
| 2007/0076746 A1 * | 4/2007 | Faska et al. | ............... | 370/463 |
| 2007/0195824 A9 * | 8/2007 | Chapman et al. | ............... | 370/490 |
| 2008/0174948 A1 * | 7/2008 | Davis | ............... | 361/684 |

* cited by examiner

*Primary Examiner* — Chi Pham
*Assistant Examiner* — Ahmed Elallam
(74) *Attorney, Agent, or Firm* — Clements Bernard PLLC; Christopher L. Bernard; Lawrence A. Barratta, Jr.

(57) ABSTRACT

The present invention relates to a data distribution device comprising of a core electronics suite having at least two data ports where each port is in communication with its own network transport medium. At least two broadband transceivers, each in communication with its own broadband data port, enable sending and receiving of broadband data signals. At least two converters, each in communication with its own transceiver, enable the conversion of RF modulated data signals into data packets and the conversion of data packets into RF modulated data signals. The device includes a data switch, in communications with at least two converters and at least two broadband transceivers, for inspecting and routing data packets between data ports; a processor in communication with the data switch that controls the sending and receiving of data packets between at least two converters; and an exterior housing that is sealed and environmentally hardened to allow the data switch, the processor, and the converters with their transceivers, to operate in an outdoor environment.

24 Claims, 23 Drawing Sheets

ARCHITECTURE 2: OUTDOOR ETHERNET OVER COAX FEEDING INDOOR POINT-TO-MULTIPOINT

ARCHITECTURE 3: OUTDOOR POINT-TO-POINT FOR DEDICATED ACCESS / ENTERPRISE SERVICES

ARCHITECTURE 4: OUTDOOR POINT-TO-POINT FEEDING WIRELESS ACCESS POINTS

OUTDOOR HARDENED EXO-MODULAR AND MULTI-PHY SWITCH

CROSS-REFERENCE TO RELATED APPLICATION

The present non-provisional patent application claims the benefit of priority of U.S. Provisional Patent Application No. 60/877,296, filed Dec. 27, 2006, and entitled "OUTDOOR HARDENED EXO-MODULAR AND MULTI-PHY SWITCH," the contents of which are incorporated in full by reference herein.

FIELD OF THE INVENTION

The present invention relates generally to packet-switching devices used in broadband communications systems. More particularly, in various exemplary embodiments, the present invention relates to devices that switch packets, typically Ethernet packets, in last-mile access networks used by cable operators, telephone companies, wireless access companies, or any telecommunications service operator.

BACKGROUND OF THE INVENTION

Recently, the need for increased amounts of bandwidth capacity has become clear in virtually every category of telecommunications, including small-sized business, medium-sized business, and large enterprises, residential users that watch television, surf the web, talk on wireline and wireless telephones, cell towers that are expanding into G3 (third generation) and G4 (fourth generation) wireless data networks, wireless access points that are expanding from retail hot-spots to larger mesh-based coverage areas, etc. The demand for capacity expansion is seen in literally areas, and furthermore, this demand is growing significantly in the upstream (or "user-generated") direction where, in the past, Internet/web-based information and television services have been very asymmetric in the downstream direction. The surge in user-generated content, including the publishing of home video content and the like, has exacerbated the upstream capacity issue.

Another axis of capacity expansion is in the proliferation of devices, both fixed and mobile, that will be sending and receiving information, from hand-held to vehicle-based to home-based to office-based. As these new devices expand from being one-service devices (e.g. voice only, data only, television only) to multi-service devices (integrated voice/data/video devices), the consumption of bandwidth capacity is forecast to grow dramatically, again in both the downstream and upstream directions.

The transition to Ethernet as the basis for transport of information across long distance and metropolitan networks is underway. This is causing a gradual transition away from ATM and TDM-based networks to Carrier Ethernet-based networks. Similarly, in the customer premises, be they business offices or residential homes, there is a large scale transition to Ethernet-based in-premise networks. This leaves the last remaining "Ethernet gap" in the last mile access networks. And now these access networks are beginning their transition to carrier Ethernet. For telephone companies, this means fiber-to-the-premises (FTTP) in the more densely populated areas, where fiber construction can be cost-justified. For the less densely populated areas, some form of fiber-to-the-curb (FTTC) or fiber-to-the-node (FTTN) architectures are under construction. A common thread in all of these networks is that Internet protocol (IP) packets using Ethernet-based networking protocols are being used to carry information of any type across many different types of media, including fiber, coaxial cable, twisted pair telephone wire, cat-5 or cat-6 Ethernet cable, WiFi, WiMax, and free space optics.

It is necessary, therefore, to have switches that can cross-connect (i.e. switch) packets from one type of physical medium to another. It is also important that these switches have the ability to be located outdoors. Some of the drivers for outdoor switching are as follows. First, ADSL and VDSL networks of all varieties are very distance-dependent to determine the performance, and thus, the capacity, of their transmissions. By moving the optical-to-copper conversion/aggregation point deeper into the network (i.e. outdoors), the distance to be transmitted over the copper wires is reduced, thereby increasing the bandwidth performance on the copper pair. Second, switches have traditionally been located in air-conditioned and thermally-controlled "brick-and-mortar" buildings, requiring the costs of real estate, maintenance, power for heating and air-conditioning, zoning for construction, etc. Outdoor switches, on the other hand, can be mounted on telephone pole strands, in street cabinets and pedestals, in underground vaults, as well as in indoor settings. The flexibility of using outdoor locations dramatically reduces the cost of housing and maintaining the switches. Third, traffic management of information flows can be significantly improved if the intelligent switching device is located nearer to the actual location of capacity usage. Bandwidth distribution in the downstream and bandwidth contention resolution in the upstream are best done at the ingress point of the access network rather than on the opposite side of the access network, which needlessly consumes capacity across the network.

BRIEF SUMMARY OF THE INVENTION

The present invention, in various exemplary embodiments, addresses new art by providing outdoor Ethernet switching devices for transporting and aggregating IP data packets within the access portion of telecommunications networks. The outdoor nature of the present invention allows the switch to be placed anywhere in the telecommunications environment, including any climate and any outdoor or indoor mounting. Thus, the present invention is sealed from harmful ingress, such as water. It is durable from corrosion, even in high-salt environments. It can operate normally, meeting all performance specifications, in temperature ranges from about −40 degrees Celsius to about +60 degrees Celsius, and temperatures as high as about +80 degrees Celsius are not harmful to the device.

In addition to being environmentally hardened, the present invention is said to be "exo-modular". This means that the many types of transmission, intelligent switching, and power modules can be added or removed from the exterior of the housing. In this sense, each module has its own exterior access for installation or removal, and these operations can be "hot-swapped" while the switch is powered-up and running. Exo-modularity is a unique function because it allows the ultimate in field flexibility without having to open an outer shell which might expose or endanger other internal components of the switch. Because of the success-based deployment models of many telecommunications operators, where additional hardware is installed only when there are new customers to be served, exo-modularity is a new and unique value supporting the preferred business model. Exo-modularity also provides advances in the ability to maintain and repair components of the switch device while leaving other parts in full operation, thus improving the availability (i.e. "up-time") of the network. Improving network availability has become important for many customers with mission-critical communications needs, including voice services, healthcare applications, emergency or safety applications, homeland security applications, financial applications, etc.

Another key attribute of the present invention is the multi-PHY attribute. The invention can accept port modules for coaxial cable, twisted pair telephone wire, Ethernet cable, fiber optic cables, radio links via antennae ports, and a growing list of physical (i.e. "PHY") transmission port types. Since the switch performs the interconnection functions across many ports, the switch uses a common switching medium, while each of the transmission ports handles the adaptation or media conversion for its particular medium. The importance of multi-PHY port modules in the present invention is highlighted by the economic factors experienced by telecommunications service providers. For example, if a coaxial cable is already present in a network, a switch module can be modularly added for transmission over coaxial cable. If there is not a coaxial cable present, the operator may wish to use a twisted pair telephone module for transmission over telephone lines. If no lines are present, the operator may wish to construct new fiber optic lines and terminate at a fiber module in the present invention. And if construction is not economically favorable, the operator may wish to use a wireless radio module to serve as the transmission medium. Moreover, since the telecommunications service itself is defined at a higher level of abstraction, with attributes such as quality of service (QoS), guaranteed bit-rate, or burst rate options, the service definition can be done independent of the physical transmission medium.

The center of the present invention, and in fact one of the exo-modular modules, is a switch module. This is an intelligent packet switching device that can interpret portions of the packets to determine source and destination addresses, QoS levels, and packet priority in order to determine which output port to switch each packet to. The assignment of QoS levels and other service definition parameters for specific customers is assigned by a central server that is in communication with all switches in the network.

Another key module in the present invention is the exo-modular power module, which can be installed as single power supplies or dual-redundant power supplies. This power module derives its power from many possible sources, including power that is present on any metallic transmission medium, including any of the metallic-PHY exo-modular port modules, or power can be derived from a unique power feed coming into the power supply module itself. The power supply module supplies the correct form of power to the other modules in the switch.

All of the modules of the exo-modular switch device are plugged into a mid-plane connector system that interconnects all of the power, switch/processor, and transmission port modules without the use of cables. All electrical signals travel through either hard connectors or printed circuit board traces so that wire cables are completely eliminated from the inside of the device. This reduces cost and increases reliability of the device, and it extends the life of the device in harsh outdoor environmental conditions. Furthermore, the mid-plane connector system allows modules to be bi-laterally inserted into the housing from the two opposite ends of the device, allowing convenient connection to cabling that is naturally running into the device from one end and out of the device from the other end. This bi-lateral orientation allows the device to be spliced into pre-existing cabling systems, allowing the pre-existing cables to run in their existing pathways without the need for bending the cables.

BRIEF DESCRIPTION OF THE DRAWINGS

These and other features and advantages of the present invention will be more fully understood by the following illustrative description with reference to the appended drawings, in which like elements are labeled with like reference designations and which may not be to scale.

DETAILED DESCRIPTION OF THE INVENTION

Figure 1:
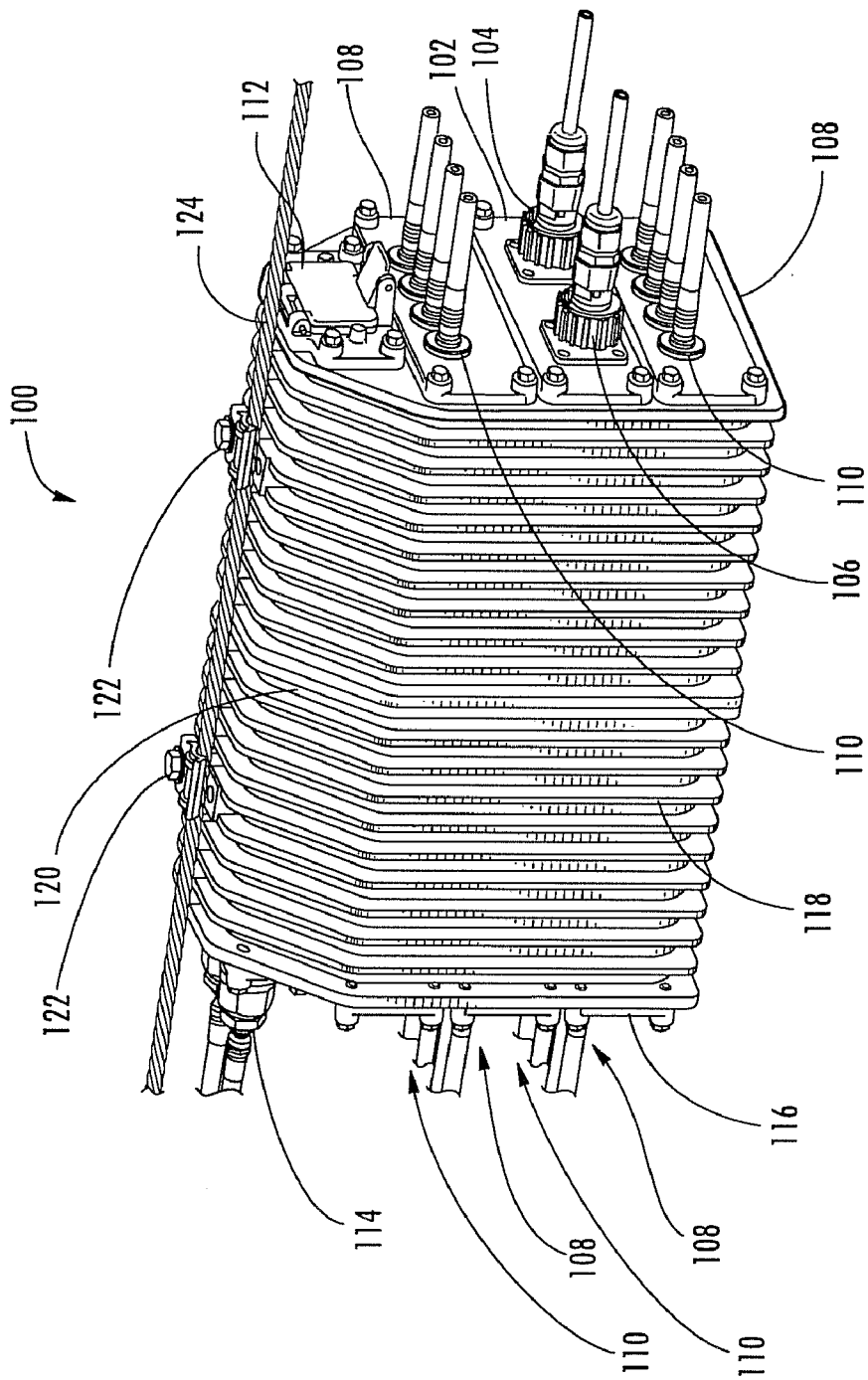
FIG. 1 is a perspective view of an outdoor hardened exo-modular, multi-PHY switch according to an illustrative embodiment of the present invention.

FIG. 1 is a perspective view of an outdoor hardened exo-modular switch device 100 according to an illustrative embodiment of the present invention. The device 100 includes a fiber optic plug-in module 102 with two ports 104 and 106 that also contains a processor and data switch on the middle front slot of the device 100. The device 100 also includes four coaxial cable plug-in modules 108. Each coaxial cable plug-in module 108 includes four coaxial cable data ports 110. The device 100 further includes a maintenance module 112 on the top front, a coaxial cable power connector 114 on the top back, and a power supply module 116 on the bottom rear. In one exemplary embodiment, the device 100 includes heat fins 118 on the device outer housing or package 120 and/or a set of strand-mounting clamps 122 on the top.

In operation, in the downstream direction, the exo-modular switch 100 receives 1 Gbps or 2 Gbps or 10 Gbps (i.e. a flexible amount) of Ethernet traffic in one or more of the of the fiber optic switch ports, such as, for example, port 106. In one exemplary embodiment, the fiber optic module 102, which has a processor and a switch (see FIG. 2), uses standard Ethernet protocol techniques to determine the destination port for each of the packets of data received from the fiber optic transmission stream at port 106. Each packet is then addressed and placed on the backplane for transmission on one or more of the coaxial cable ports 110 at one or more modules 108. In one exemplary embodiment, the Ethernet packet data is modulated at a frequency above about 860 MHz on one or more coaxial ports 110. In other exemplary embodiments, the frequency is above about 1 GHz, 5 GHz, or 10 GHz. Each coaxial module 108 may also receive legacy signals, typically (but not necessarily) below about 1 GHz, which the module 108 then combines, or diplexes, with the packet data described above so that the Ethernet and the legacy signal can both be transported on the same coaxial cable to or from the same port 110.

In certain exemplary embodiments, the role of the power module 116 is to convert the native frequencies provided by the power source cable 114 into other current and voltage levels as needed by the other modules connected to the mid-plane of the device 100. In one exemplary embodiment, the maintenance module 112 provides real-time information to service personnel about the operational characteristics of the entire exo-modular switch device 100, with information such as power levels, temperature, information transfer error rates, and firmware versions currently in use within the switch device 100. In one exemplary embodiment, the strand-mount clamps 122 allow the exo-modular switch device 100 to be mounted on a standard aerial-mounted wire strand 124. Because, in certain exemplary embodiments, all transmission ports, regardless of type, including fiber, coaxial cable, and/or wireless, are bi-directional ports, the orientation of data transmission in either the downstream or upstream directions is identical. Thus, there is no difference in the operation of the exo-modular switch device 100 for upstream versus downstream transmission on any kind of wireline or wireless media.

Figure 2:
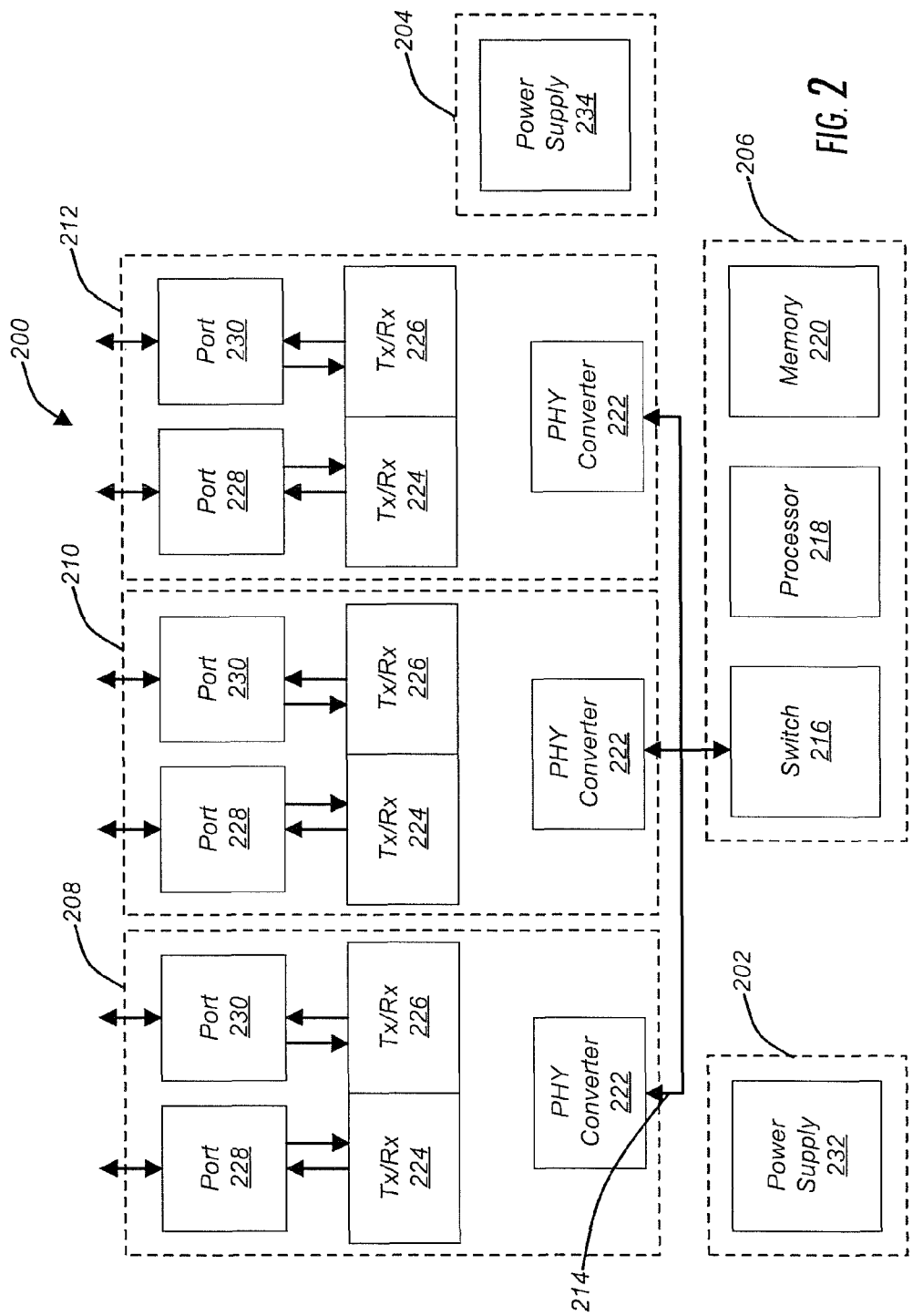
FIG. 2 is a functional block diagram of an exo-modular, multi-PHY switch according to an illustrative embodiment of the present invention.

FIG. 2 is a functional block diagram of the exo-modular, multi-PHY switch device 200, such as the device 100 in FIG. 1, according to an illustrative embodiment of the present invention. The device 200 includes a first power supply module 202, a second power supply module 204, a switch module 206, a first port module 208, a second port module 210, and a third port module 212. The modules may be interconnected via a mid-plane element 214 that provides electrical interconnections between the modules. The switch module 206 may include a data switch 216, a processor 218, and/or a memory 220. In one exemplary embodiment, the switch module 206 is a stand-alone module. In other exemplary embodiments, the switch module 206 is integrated with and/or part of at least one of the port modules 208, 210, 212. In one exemplary embodiment, each port module includes its own switch module 206. In other exemplary embodiments, only one port module 208 includes a switch module 206 that support other port modules 210 and 212.

In one exemplary embodiment, the port module 208 includes a PHY converter 222 that converts data packets into the proper PHY formats for one or more transceivers 224 and 226. Each transceiver may include an RF modem, a wireless modem, a fiber optic modem, or other like transceiver, depending on the transmission medium. In certain exemplary embodiments, the input/output of each transceiver is in communication with a data port 228 and 230. Each data port 228 and 230 may include a data connector and/or antenna to enable connection of the port to a physical cable such as coaxial cable, twisted-pair, or fiber. In one exemplary embodiment, the ports 228 and 230 may be interconnected so as to enable the pass-through of legacy signals below about 860 MHz. In certain exemplary embodiments, the port modules 210 and 212 have the same or similar components as described with respect to port module 208. In one exemplary embodiment, each port module has at least one port, such as port 228. Each port module may include, without limitation, at least 2 ports, 4 ports, 6 ports, 8 ports, 20 ports, 50 ports, and 100 ports. In certain exemplary embodiments, the operation of the various components of the device 200 are the same or similar to the device described in U.S. Pat. No. 7,146,360, issued on Dec. 5, 2006, the entire contents of which are incorporated herein by reference.

In one exemplary embodiment, the power module 202 includes a power supply 232 while the power module 204 includes a power supply 234. In certain exemplary embodiments, the power supplies 232 and 234 concurrently provide power to other modules of the device 200. In one exemplary embodiment, the power supplies 232 and 234 alternatively provide power to the other modules of the device 200. In one exemplary embodiment, either power supply 232 or 234 may be hot-swapped while the other provides power to the device 200. In certain exemplary embodiments, any one of the modules may be hot-swapped while the device 200 continues to support communications operations.

Figure 3:
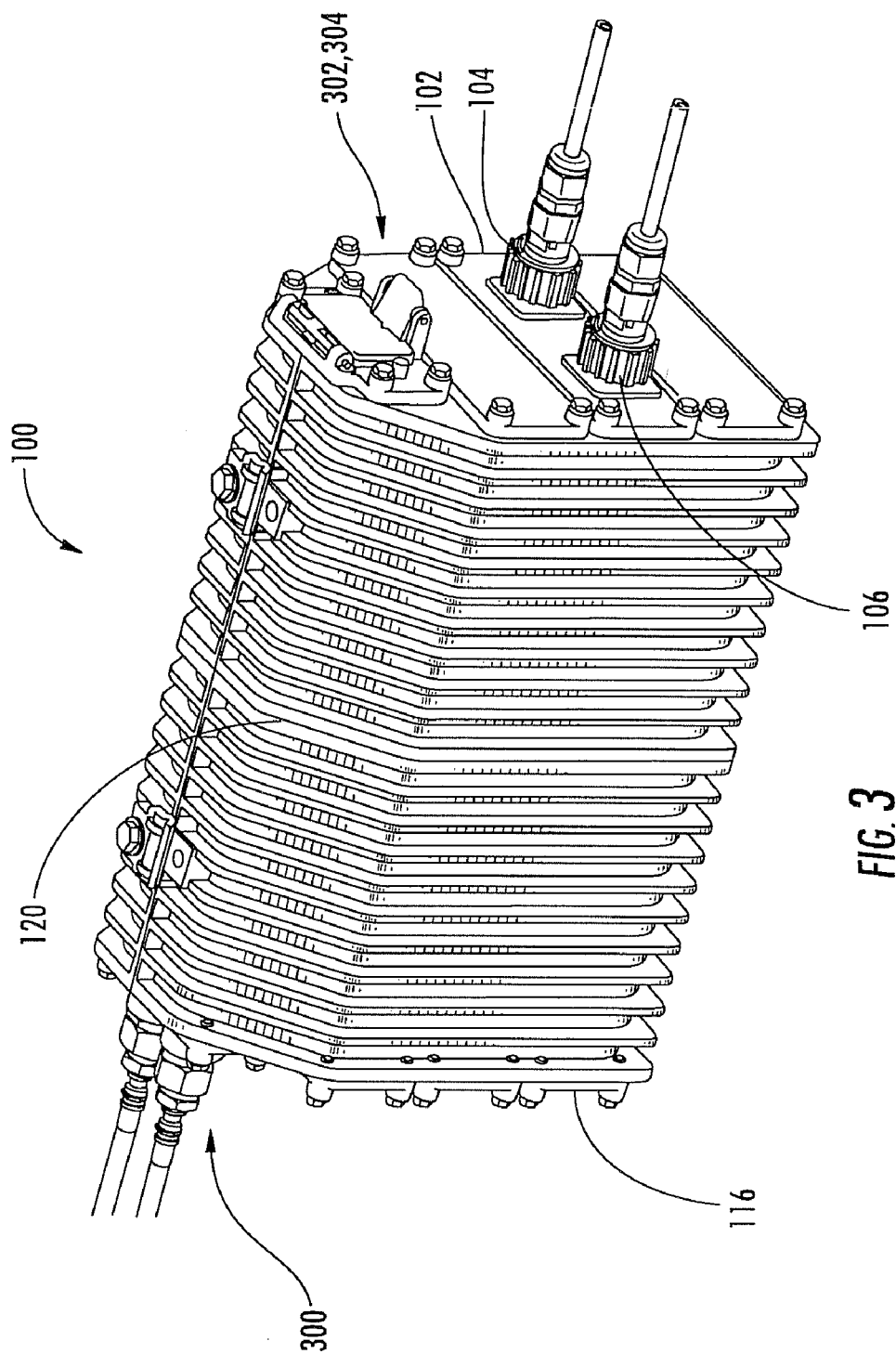
FIG. 3 is a perspective view of a Core Hardened Electronics Package according to an illustrative embodiment of the present invention.

FIG. 3 is a perspective view of the core hardened outdoor housing package 120 of the exo-modular switch 100 according to an illustrative embodiment of the present invention. This illustration includes a switch module 102 with two fiber-optic transmission ports 104 and 106, dual power connections 300, a power module 116 (on the rear of the illustration), and the remainder of the housing with four option module slots 302 fitted with sealed covers 304.

In operation, this implementation shows the minimum configuration. The exo-modular switch 100 can be used in this configuration for pre-installation use, where north-bound and south-bound fibers are installed and connected, with various option modules to be added later on an as-needed basis. In this sense, the two fiber ports 104 and 106 are used to implement a deep fiber backbone. When other switch port connections are needed, each option module can be added one by one based on the kind of media needed to be supplied with data service. For example, coaxial cable ports can be added if coaxial media is to be used, or a radio module can be added if wireless transmission is to be implemented, or fiber ports can be added if either fiber optic subscriber drop cables or additional fiber optic shared trunks are to be used. In fact, the number of different kinds of port modules could vary greatly, including xDSL modules, point-to-multipoint modules, such as cLINK Access or HPNA, or RJ45 Ethernet modules can be added to feed twisted-pair based endpoints or external IP cameras or external radios or external point-to-multipoint network coordinators.

The purpose of the dual power cables 300 that are connected to the rear top slot is for a daisy-chaining application where power is fed from an external source to the exo-modular switch 100, and then power is daisy-chained from the first switch to a second switch, and so on.

Figure 4:
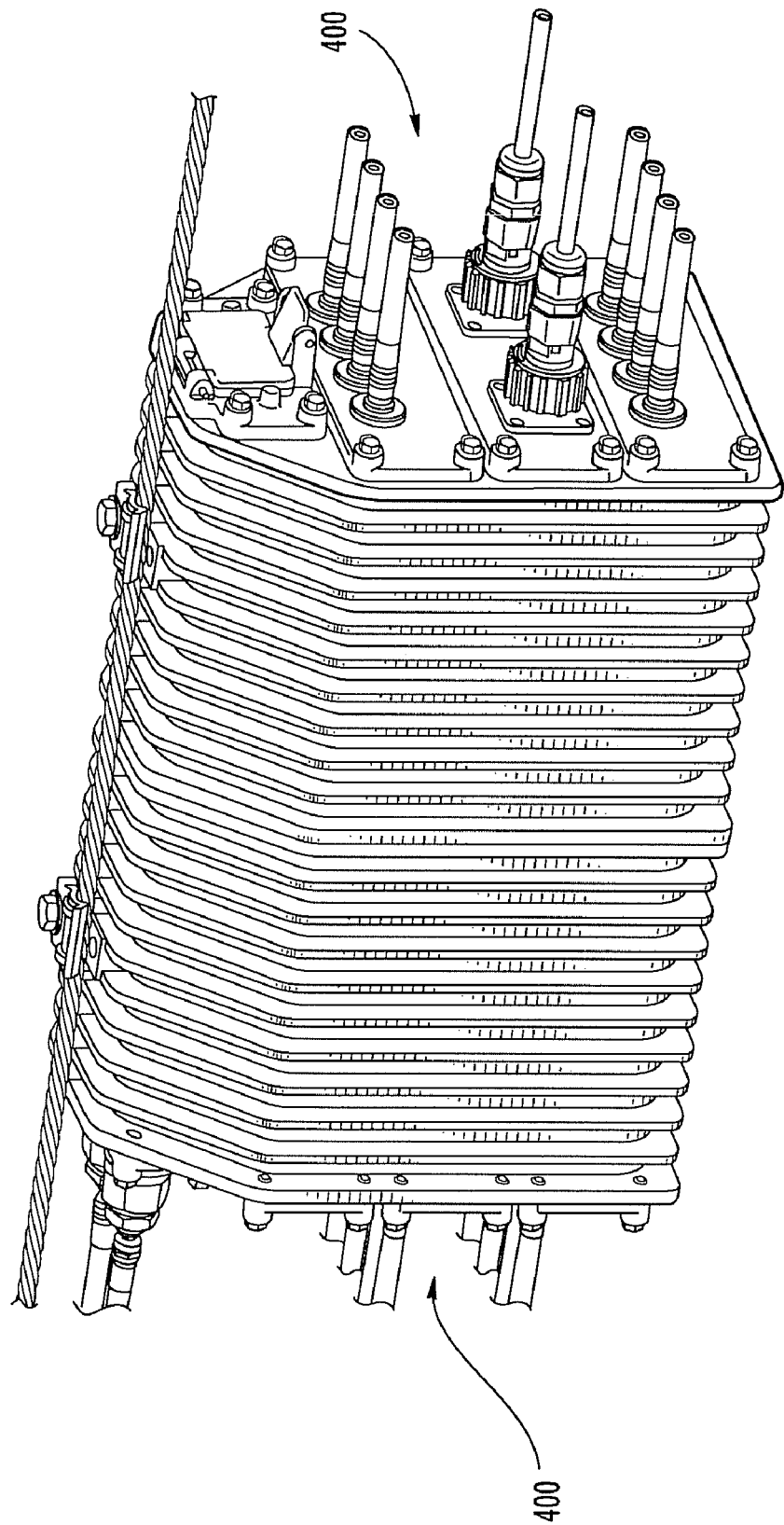
FIG. 4 is a perspective view of a switch configured with modem modules and cabling according to an illustrative embodiment of the present invention.

FIG. 4 is a perspective view of a switch configured with modem modules and cabling 400 according to an illustrative embodiment of the present invention.

Figure 5:
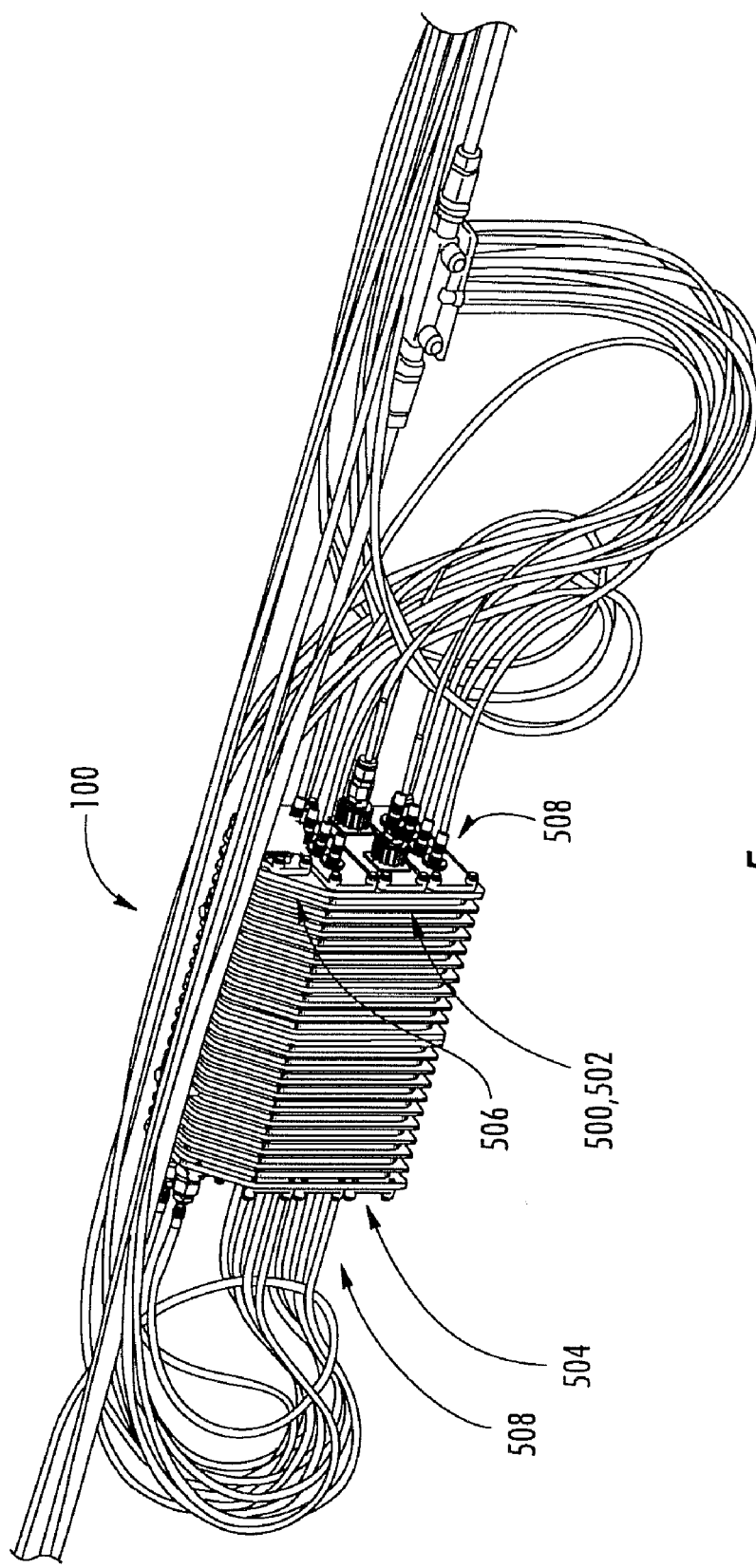
FIG. 5 is a perspective view of a curb switch configuration with taps and cables according to an illustrative embodiment of the present invention.

FIG. 5 is a perspective view of an outdoor hardened exo-modular switch 100 in its curb switch configuration according to an illustrative embodiment of the present invention. The curb switch configuration includes a switch module 500 with two fiber-optic ports 502, a power supply module 504, a maintenance module 506, and up to 4 coaxial modem modules 508.

In operation, the curb switch configuration allows the existing tap element to be used without modification. The existing drop cable leading to the subscriber's house is unscrewed from its connection to the tap and then screwed into the connection on the exo-modular switch coaxial modem port 508. Then a coaxial jumper is connected from the previously used tap port to the coaxial modem module port 508 on the exo-modular switch 100. This has the effect of feeding the legacy cable signals into the exo-modular switch's coaxial modem module 508 where the legacy signal is diplexed (combined) with the Ethernet data signals and then modulated in combination on the coaxial drop cable leading to the subscriber's home.

Because each existing tap port is used as is, the pre-existing tap values, consisting of signal strength metrics, are preserved in this configuration of the exo-modular switch 100.

Figure 6:
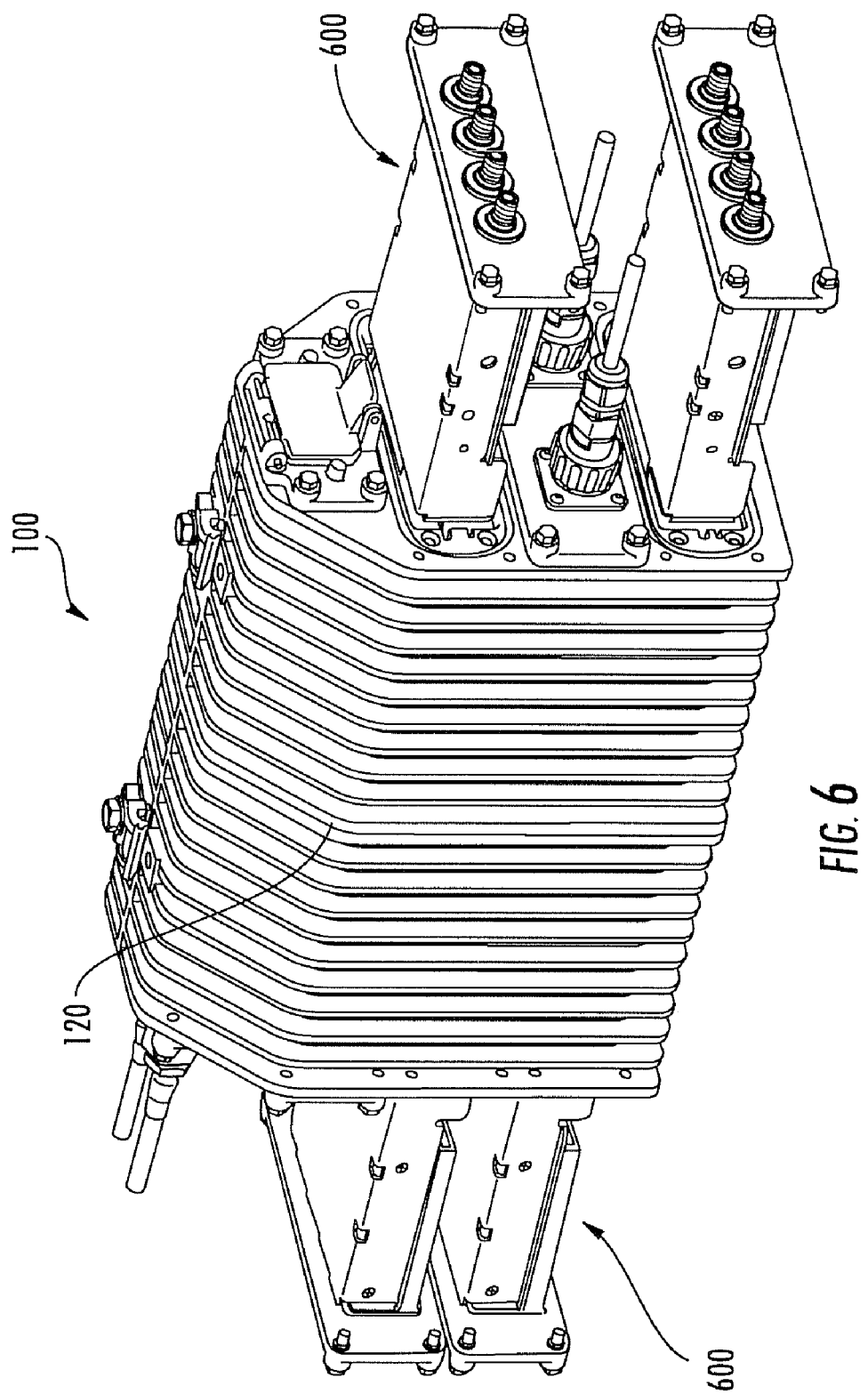
FIG. 6 is a perspective view of a switch including externally accessible data modules according to an illustrative embodiment of the present invention.

FIG. 6 is a perspective view of an outdoor hardened exo-modular switch 100 with externally-accessible data modules 600 according to an illustrative embodiment of the present invention. The data modules 600, also referred to as option modules, include a wide range of different module types, including coaxial cable modem modules for point-to-point communications, coaxial cable modem modules for point-to-multipoint communication, fiber optic communication modules, digital subscriber line (XDSL) modules for twisted-pair copper communication, universal twisted-pair (UTP) modules for standard baseband Ethernet communication on copper twisted-pair wires, 802.11a/b/g/n modules for wireless communications, WiMax modules, or any other kind of option modules.

In operation, the exo-modular switch 100 with option modules 600 allows various different kinds of option modules 600 to be selected flexibly based on whichever kind of media is desired for transport to each different customer or endpoint. Moreover, the term "exo-modular" is derived from the fact that these option modules 600 can be installed into the switch housing 120 directly from the outside (thereby being "exo"). Each module 600 is slid into place and then screwed down such that the faceplate of each module 600 forms a weather-tight seal with the switch housing 120. This differs from previous kinds of outdoor modular equipment in that the previous equipment typically required an outer cover or lid to be opened, thus exposing the other elements to water or dirt. With the exo-modular design, each module 600 can be added without exposing the other modules of the device 100.

Figure 7:
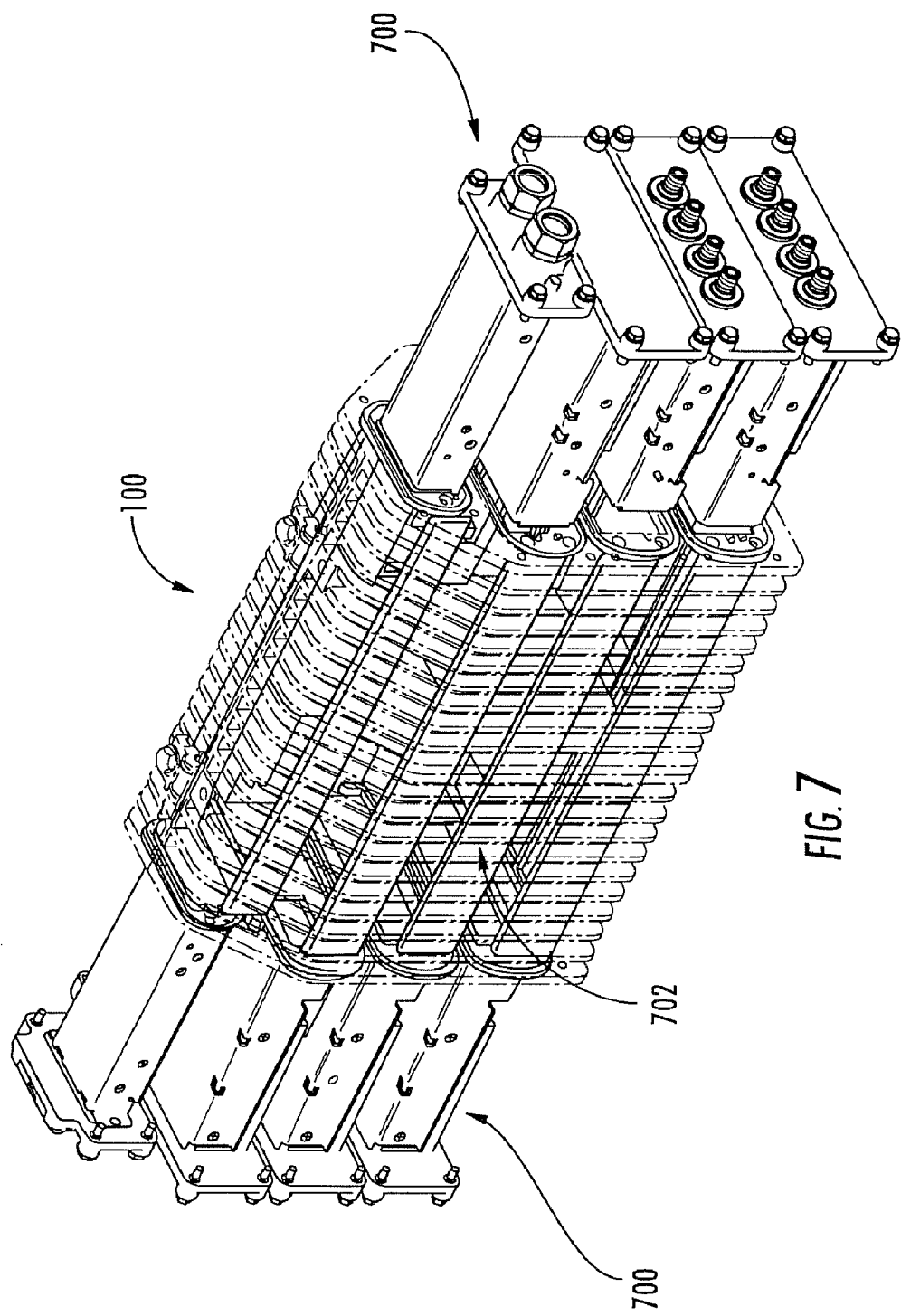
FIG. 7 is a perspective view of a switch including a mid-plane connector enabling modules to be inserted or removed from either side of the switch housing according to an illustrative embodiment of the present invention.

FIG. 7 is a perspective view of an outdoor hardened exo-modular switch 100 with option modules 700 sliding into a mid-plane connector system 702 according to an illustrative embodiment of the present invention. The mid-plane connector system 702 includes a bi-lateral circuit board with connectors on either side of the board, and electrical paths to allow communication signals and power to flow between any combination of the many modules 700 or corresponding module slots.

In operation, the mid-plane connector system 702 provides a firm plug-in connection between the mid-plane board connector and each module 700 that is plugged into a corresponding option module slot. The various electrical conductors within the connector system 702 carry either power or communications signals or both. The mid-plane system 702 has the valuable effect of completely eliminating cables from the exo-modular switch design. Since cabling and cable connectors are a very common source of failure in outdoor products, eliminating the cabling (i.e. jumper cables) improves the reliability and reduces the cost of the device 100. Since the mid-plane embodiment of the exo-modular device has option slots on two sides of the device 100, the mid-plane 702 provides connections to modules 700 on both sides of the device 100. The use of a two-sided design also provides convenient plant installation in aerial outdoor plant because there is frequently a "north-south" arrangement in outdoor communications plants.

Figure 8:
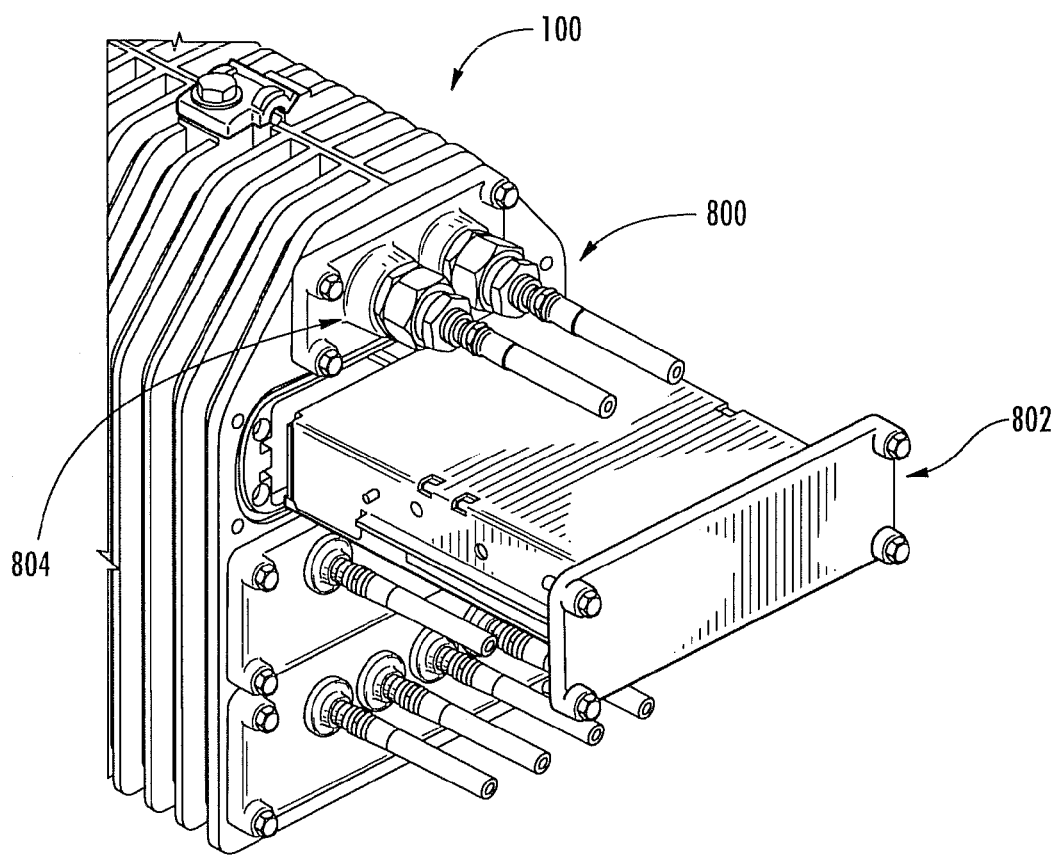
FIG. 8 is a perspective view of a switch housing including a power module according to an illustrative embodiment of the present invention.

FIG. 8 is a perspective view of an outdoor hardened exo-modular switch 100 with its powering arrangement according to an illustrative embodiment of the present invention. The powering arrangement of the exo-modular switch 100 includes a power input port 800 that is separate from the power conversion modules 802 (also referred to as the "power supply"), a second power output port 804 to support daisy-chaining of additional devices, one or two power conversion modules 802 for redundancy, and the ability to hot-swap either the redundant power conversion module 802 (or any other module type, for that matter).

In operation, the use of a power input port 800 that is different from the power conversion module 802 is important for continuous operation of the exo-modular switch 100 in the event of the failure of one of the two power conversion modules 802 because a power conversion module 802 can be swapped without having to disconnect and reconnect the power supply cable. Thus, since the more likely module to experience a failure is the power conversion module 802, the hot-swap replacement of the power module 802 is facilitated by having the power supply cable connected to a different input port 800 than on the power conversion module 802 itself.

The use of two power connection ports 800 and 804 is intended to allow one port 800 to receive the power source current while the second port 804 allows the power to be daisy-chained to another exo-modular switch. This allows for easy installation since the first power cable typically comes from the cable plant, and then additional exo-modular switches can be fed power without having to use additional (power-passing) taps from the cable plant where the power comes from.

The exo-modular switch 100 can receive its power from either one of two power conversion modules 802. Since the power conversion module 802 is often duplicated for redundancy, the second module 802 takes over seamlessly and immediately if the first power conversion module 802 fails. Furthermore, the failed power conversion module 802 can be removed while the exo-modular switch 100 is in operation, and a new power conversion module 802 can be inserted also while the switch 100 is in operation.

Figure 9:
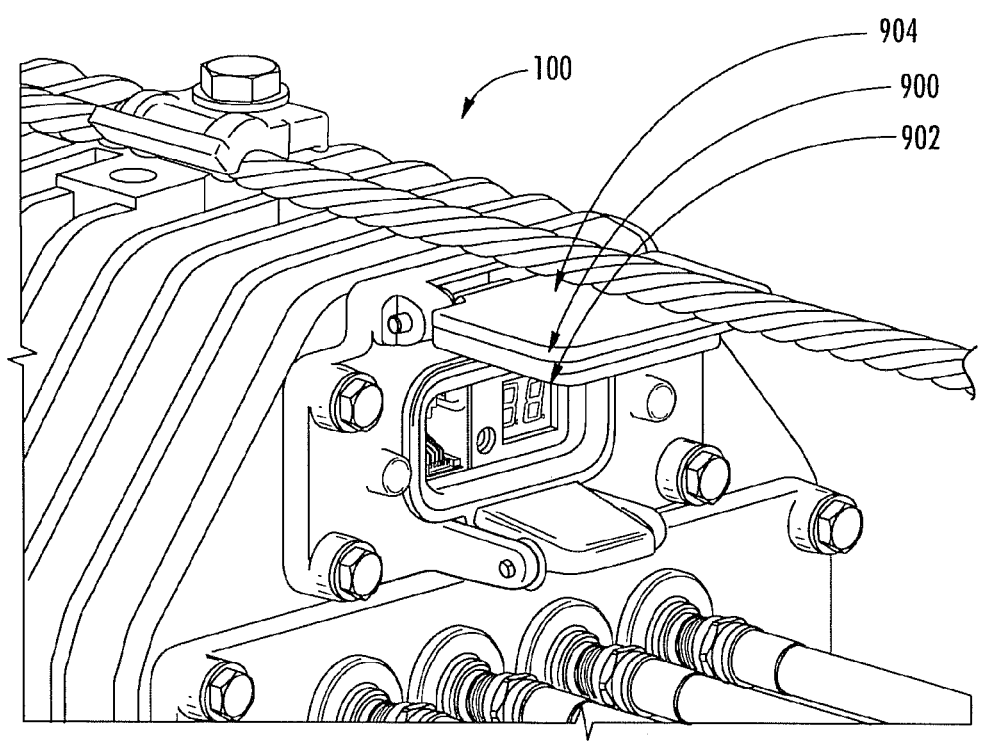
FIG. 9 is a perspective view of a switch including a maintenance port including a status indicator that enables visual determination of the operational status of the switch according to an illustrative embodiment of the present invention.

FIG. 9 is a perspective view of an outdoor hardened exo-modular switch 100 with its maintenance port 900 according to an illustrative embodiment of the present invention. The maintenance port 900 includes a display 902 to give visual information about the status of all modules in the exo-modular switch 100. The maintenance port 900 also includes a moveable cover 904 that both blocks information from being displayed to unauthorized personnel and also provides a weatherproof cover to protect the display 902. Maintenance information can also be useful when sent from the telephone pole location to a technician located at ground level. A radio transceiver is used in certain embodiments of the exo-modular switch 100 to allow the technician to wirelessly receive the same information as is shown on the display 902 without having to use a bucket-truck to lift him/her to the aerial location of the device 100. This increases both the speed of information retrieval and the overall safety of servicing the device 100 by avoiding the use of bucket-trucks in some situations.

When the exo-modular switch 100 is installed, the majority of the provisioning procedure is automatic. The switch 100 is auto-discovered by the network, given its IP address from a DHCP server, and automatically added to the centralized monitoring system for remote monitoring purposes. However, there is also some information that the technician wants to see immediately upon installing or later maintaining or troubleshooting the exo-modular switch 100. The technician wants to know the power levels in the device 100, the operational status of the elements, and a set of other technical metrics that can help indicate how to solve problems or where to look for problems in the event that problems occur. The maintenance display 902 provides this kind of information to the technician.

At the same time, some exo-modular switch implementations will use LED displays that can cause light to be emitted. Since this can be bothersome in certain environments, the front panel cover 904 is used to cover up the reflecting display 902, as well as keep the information private to those who are not servicing the device 100.

It is also valuable to be able to keep water and dirt away from the display window 902, noting that the exo-modular switch 100 is an outdoor device that is exposed to the weather and the outdoor elements. The use of a locking display cover 904 to cover and protect the display window 902 serves this purpose.

Figure 10:
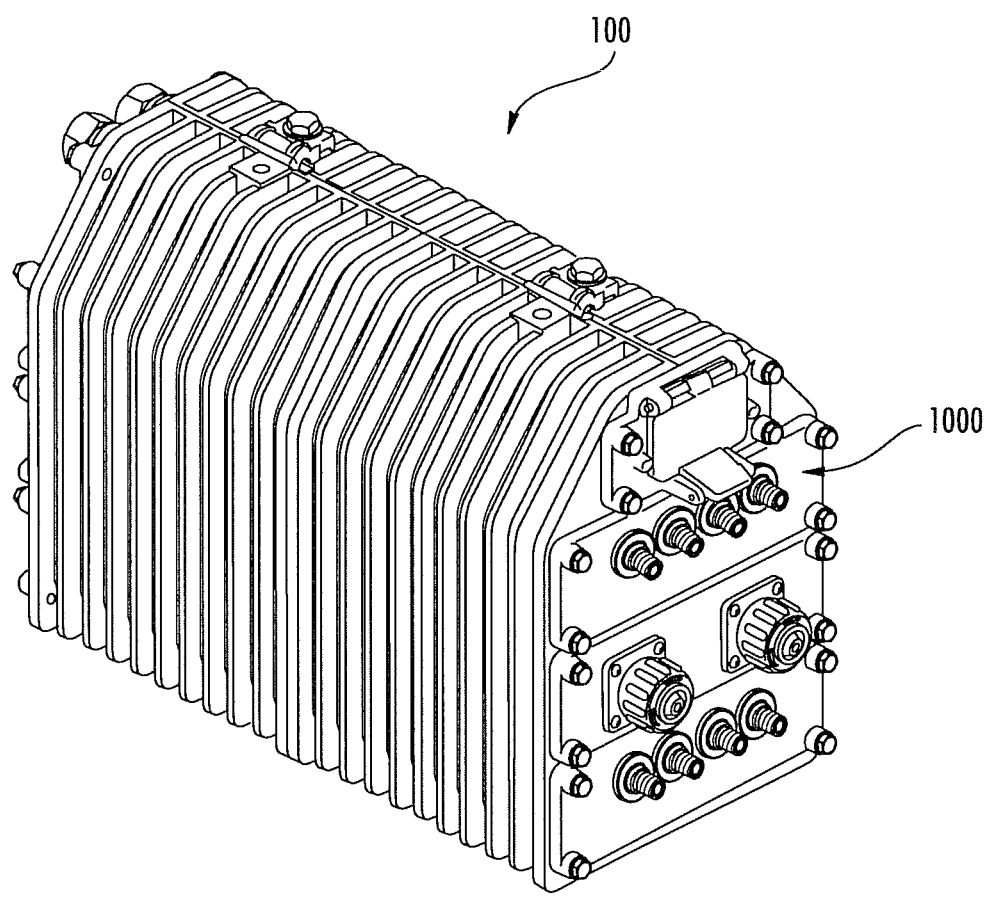
FIG. 10 is a perspective view of a switch including an exo-modular fiber optic transceiver port according to an illustrative embodiment of the present invention.

FIG. 10 is a perspective view of an outdoor hardened exo-modular switch 100 with a flexible variety of physical port types 1000 according to an illustrative embodiment of the present invention. The set of physical (or "PHY") port types 1000 corresponds to the many types of media that can be interconnected by the exo-modular switch 100. One of the key attributes of the switch 100 is that various kinds of media can be interconnected using the Ethernet switch as a common interchange format. Thus, packets coming to the switch 100 via fiber or copper or coaxial or wireless will all have a conversion function to Ethernet as part of the operation of each port module 1000. The Ethernet switch module then performs the interchange function to determine the destination port for each packet, and then the destination port module performs the conversion function back to its media type, be it fiber or copper or coaxial or wireless. Furthermore, the exo-modular switch 100 allows various different kinds of port modules 1000 to be added at any time. The unique value of the exo-modular nature of the present invention is that the various port modules 1000 can be added or removed from the outside of the device 100, facilitating spontaneous use of different transmission media types in the ever-changing outdoor access network.

Figure 11:
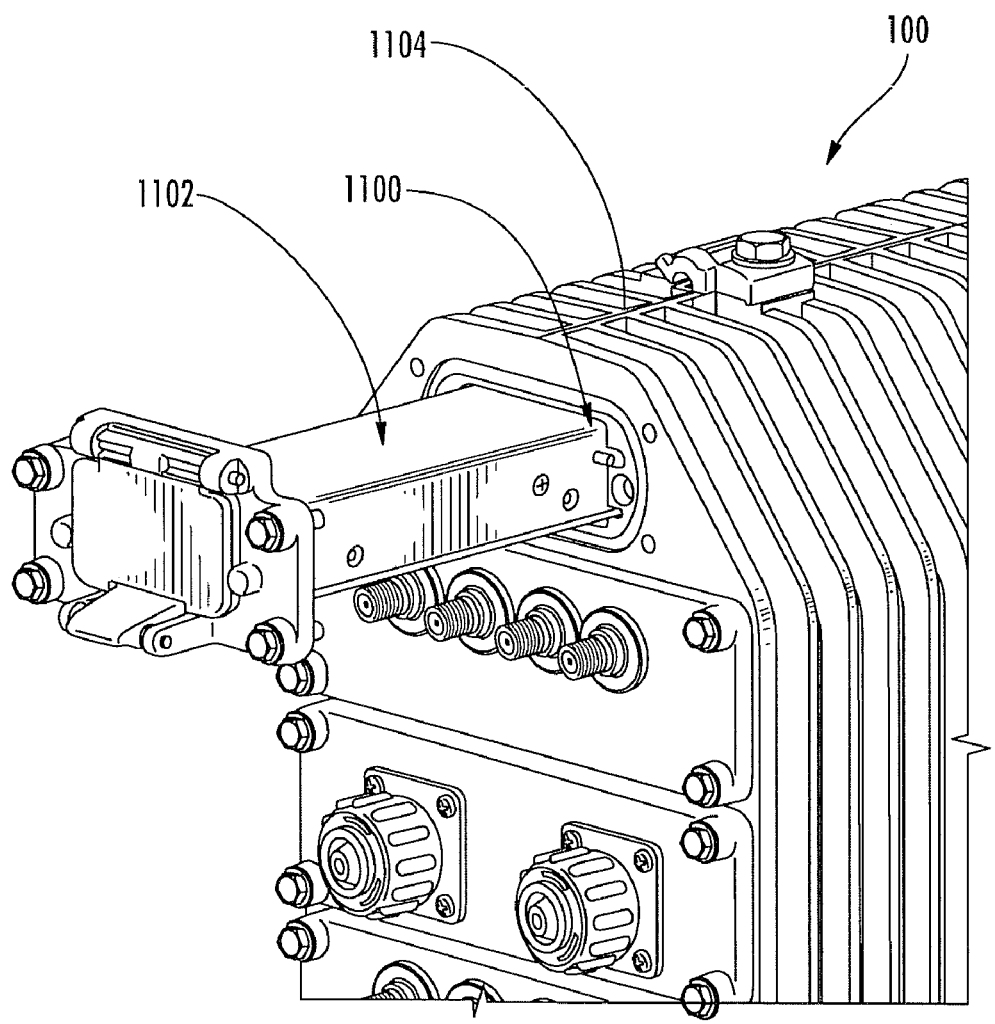
FIG. 11 is a perspective view of a switch including an exo-modular keying system that mechanically prevents modules from being inserted into improper module slots according to an illustrative embodiment of the present invention.

FIG. 11 is a perspective view of an outdoor hardened exo-modular switch 100 with a keying system 1100 that mechanically prevents modules 1102 from being inserted into illegal corresponding module slots according to an illustrative embodiment of the present invention. The keying system 1100 includes a permanent mechanical fixture in the module 1102 that matches with a corresponding permanent mechanical slot in the housing 1104 of the exo-modular switch 100, this preventing the insertion of certain modules 1102 into corresponding housing slots that are not intended to handle that module type.

The keying system allows for maintenance personnel to have limited training when inserting modules 1102 into the exo-modular switch 100, and in particular in knowing which modules 1102 can be inserted into which corresponding slots. This is especially important in a system that has many different module types. For example, the switch module, maintenance module, the power module(s), etc. will have designated slots where they should be inserted, and the many kinds of port will be able to be inserted into the other slots. With the mechanical keying system, if the maintenance person is physically able to insert a module into a slot, then it is guaranteed that this module belongs in the slot used.

Figure 12:
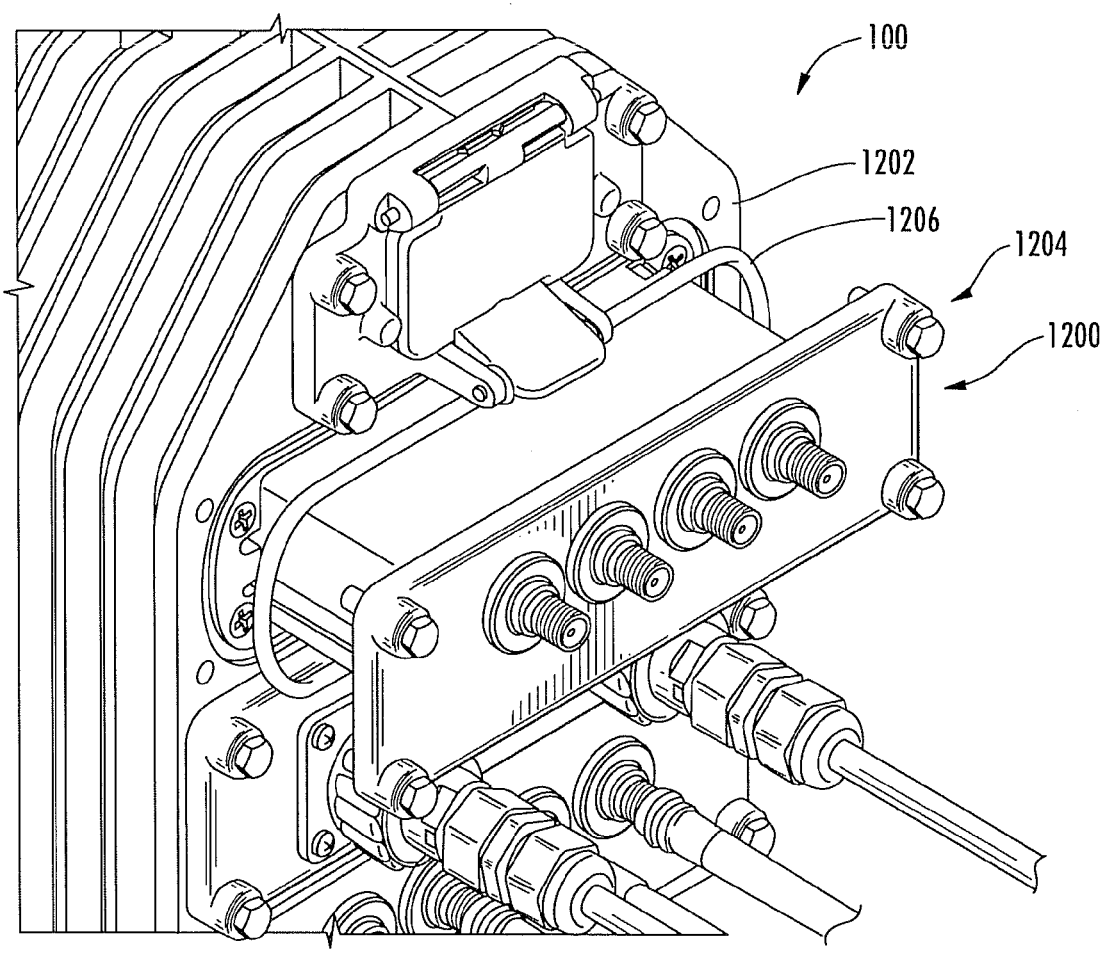
FIG. 12 is a perspective view of a switch where the exo-modular modules are connected to the switch housing positive-stop bolts that capture O-rings at a compression to seal each module to the housing according to an illustrative embodiment of the present invention.

FIG. 12 is a perspective view of an outdoor hardened exo-modular switch 100 with modules 1200 that are physically connected to the device housing 1202 with positive-stop bolts 1204 that capture O-rings 1206 at a compression that seals each module 1200 to the housing 1202, preventing environmental ingress or egress between the module 1200 and the housing 1202, according to an illustrative embodiment of the present invention. This environmental weather-sealing technique includes an O-ring 1206 for each module 1200 and approximately four positive-stop bolts 1204 to secure the module 1200 to the housing 1202 of the exo-modular switch 1200.

The environmental weather-sealing technique is a critical aspect of the exo-modular switch 100 because the very nature of exo-modularity is that modules 1200 can be flexibly added from the outside of the housing 1202 without opening up a box to expose other sensitive parts of the device 100. It is critical that installation and maintenance personnel can flexibly add or remove modules 1200 while assuring that the device 100 is sealed and weather-proofed upon completion. Moreover, this installation and maintenance function must be so reliable that little or no special training is required in order to achieve an adequate weather seal.

The O-ring 1206 provides the weather-sealing function when locked down between the module 1200 and the exo-modular switch housing 1202 to the correct compression level. The correct compression level is achieved reliably every time using positive-stop bolts 1204, meaning that the reliability of the weather-seal does not rely upon the specific compression tension applied by the maintenance person to the bolts 1204. With positive-stop bolts 1204, the maintenance person can simply screw in the bolts unto they cannot be screwed in any further ("positive stop") and the design of the exo-modular switch 100 and its modules 1200 assures that the O-ring 1206 will be compressed to the proper compression tension.

Figure 13:
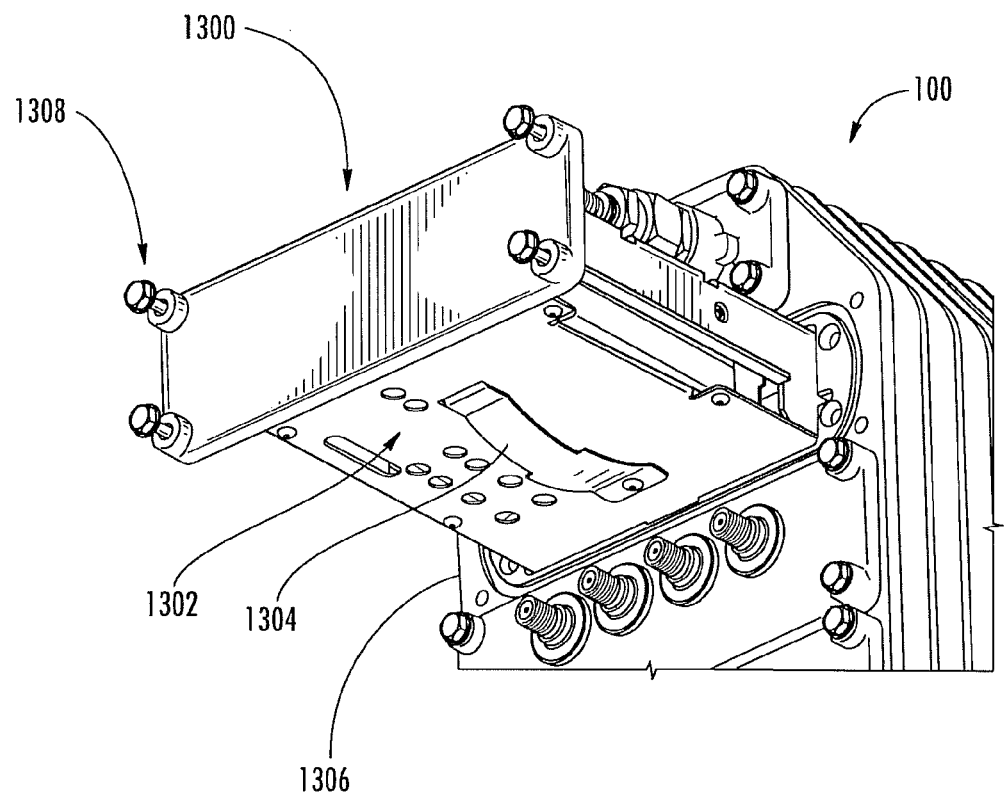
FIG. 13 is a perspective view of a switch including an exo-modular module that uses a two-stage removal system according to an illustrative embodiment of the present invention.

FIG. 13 is a perspective view of an outdoor hardened exo-modular switch 100 with modules 1300 that use a two-stage removal system 1302, including a first removal stage has a latch-stop, requiring manual release of the latch 1304 to fully remove the module 1300 from the housing 1306 according to an illustrative embodiment of the present invention.

The two-stage removal system 1302 aids in the safe removal of modules 1300 from the exo-modular switch housing 1306, especially in outdoor environments that can be harsh or awkward or dangerous. In some settings, the maintenance person is in a bucket-truck high above the ground, and in some settings the outdoor environment may be poorly lit or raining or snowing or hard to reach because of nearby tree branches. The two-stage removal system 1302 works in such a way that the maintenance person will unbolt the positive-stop bolts 1308, thus releasing the module 1300 from the housing 1306, and then the maintenance person pulls the module 1300 out of the housing 1306 until it stops at the first stage latch-stop. The maintenance person then has to manually press a release 1304 to fully remove the module 1300. The removal process prevents modules 1300 from being inadvertently dropped and damaged. It also allows modules 1300 to be partially removed or disengaged and still be allowed to sit temporarily in the housing 1306 before being fully removed.

Figure 14:
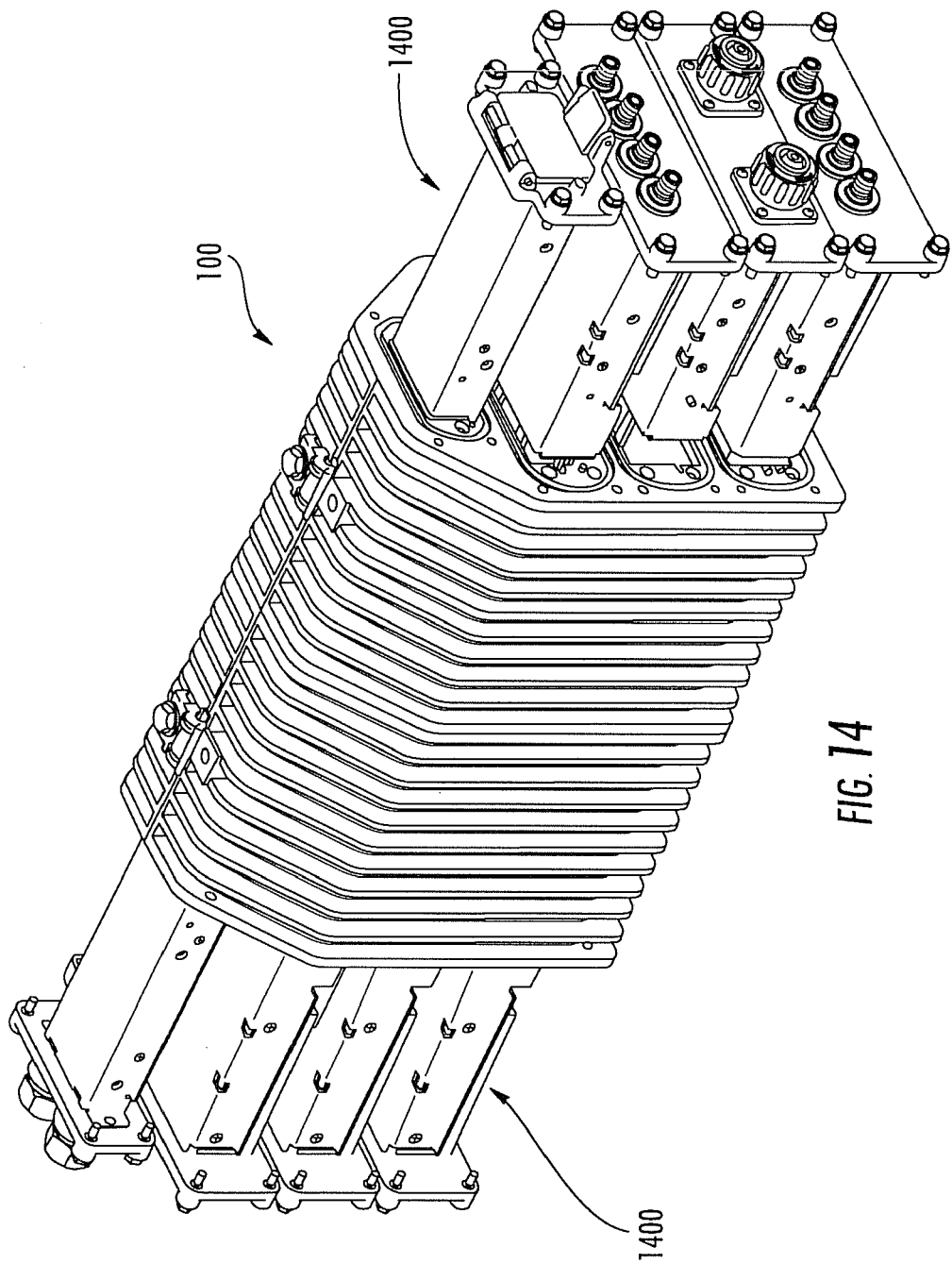
FIG. 14 is a perspective view of a switch including an alarm mechanism that informs a central monitor when the device or any module is removed according to an illustrative embodiment of the present invention.

FIG. 14 is a perspective view of an outdoor hardened exo-modular switch 100 with modules 1400 that use an auto-recognition and discovery mechanism and a status monitoring system in communication with a central monitoring system according to an illustrative embodiment of the present invention. The recognition, discovery, and monitoring system includes a topology server that receives and interprets information sent from each module 1400 of the exo-modular switch 100, certain key reporting metrics such as temperature, power levels, firmware versions, and data communications error rates, an alarming system that notifies the central topology server that a module 1400 has been removed, and a maintenance state designation to indicate that the removal of a module 1400 is authorized.

Since the exo-modular switch 100 is usually located outside in an unsecured location such as a telephone pole, it is important for a central monitoring system to have centralized visibility to the full life-cycle of events that can occur at the switch 100. This includes the initial insertion of a module 1400 into a switch, provisioning of the module 1400, monitoring of key health and performance metrics related to the module 1400, and removal or disappearance of the module 1400. At each stage of the life-cycle, the central topology server has a role to play in analyzing the health of the module 1400 and determining whether or not to generate an alarm to maintenance personnel. It is also important that maintenance personnel are able to distinguish between a module 1400 that was removed on purpose for maintenance reasons as opposed to a module 1400 that was removed without authorization, thus generating an alarm. The use of maintenance states helps to denote modules that are deliberately removed so that false alarms are avoided.

Figure 15:
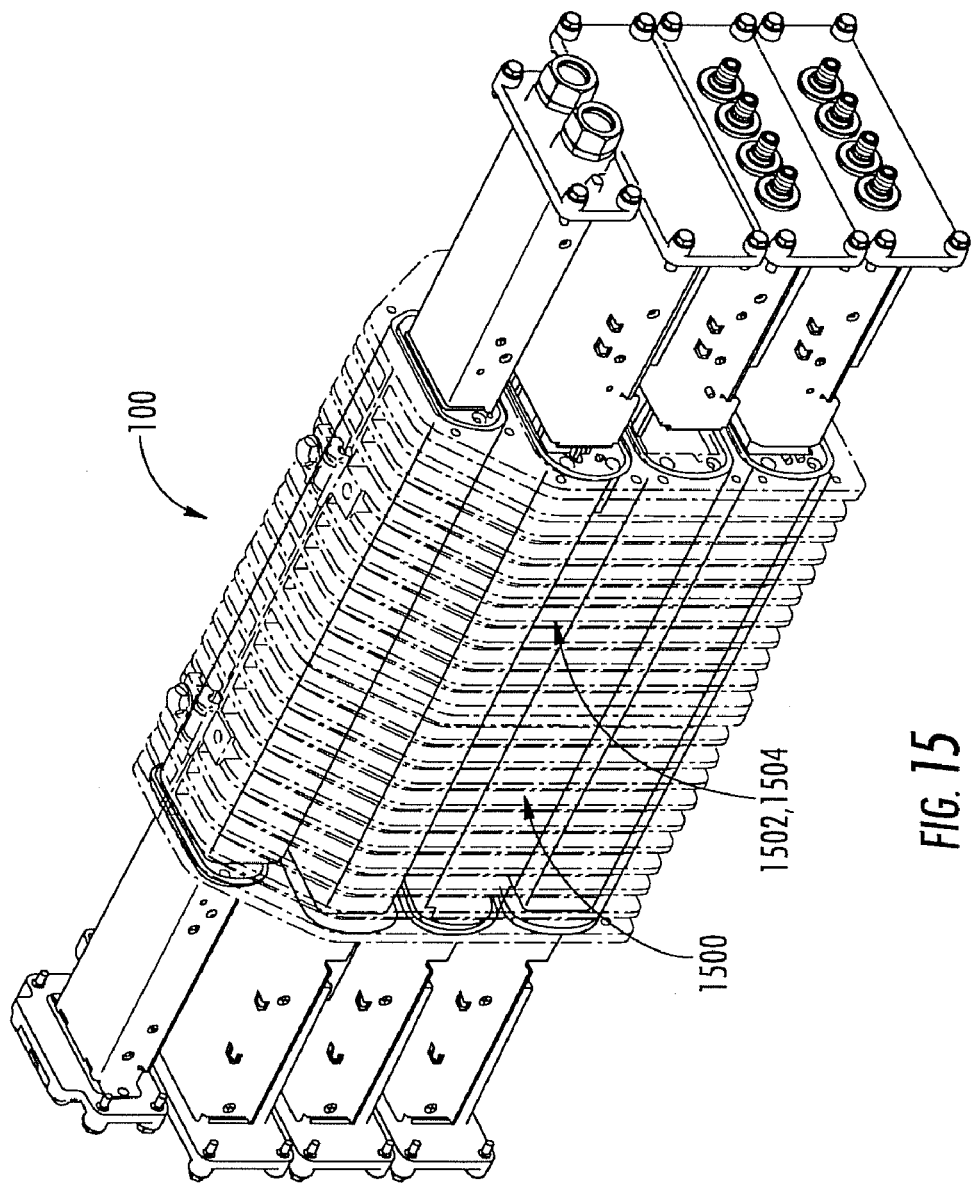
FIG. 15 is a perspective view of a backplane connector system according to an illustrative embodiment of the present invention.

FIG. 15 is a perspective view of an outdoor hardened exo-modular switch that uses a backplane connector system 1500 according to an illustrative embodiment of the present invention. The backplane connector system 1500 includes a uni-lateral circuit board 1502 with connectors 1504 on one side of the board 1502, and electrical paths to allow communication signals and power to flow between any combination of the many modules or module slots.

In operation, the backplane connector system 1500 provides a firm plug-in connection between the backplane board 1502 and each module that is plugged into an option module slot. The various electrical conductors within the connector system 1500 carry either power or communication signals or both. The backplane system 1500 has the valuable effect of completely eliminating cables from the exo-modular switch design. Since cabling and cable connectors are a very common source of failure in outdoor products, eliminating the cabling (i.e. jumper cables) improves the reliability and reduces the cost of the device 100.

Figure 16:
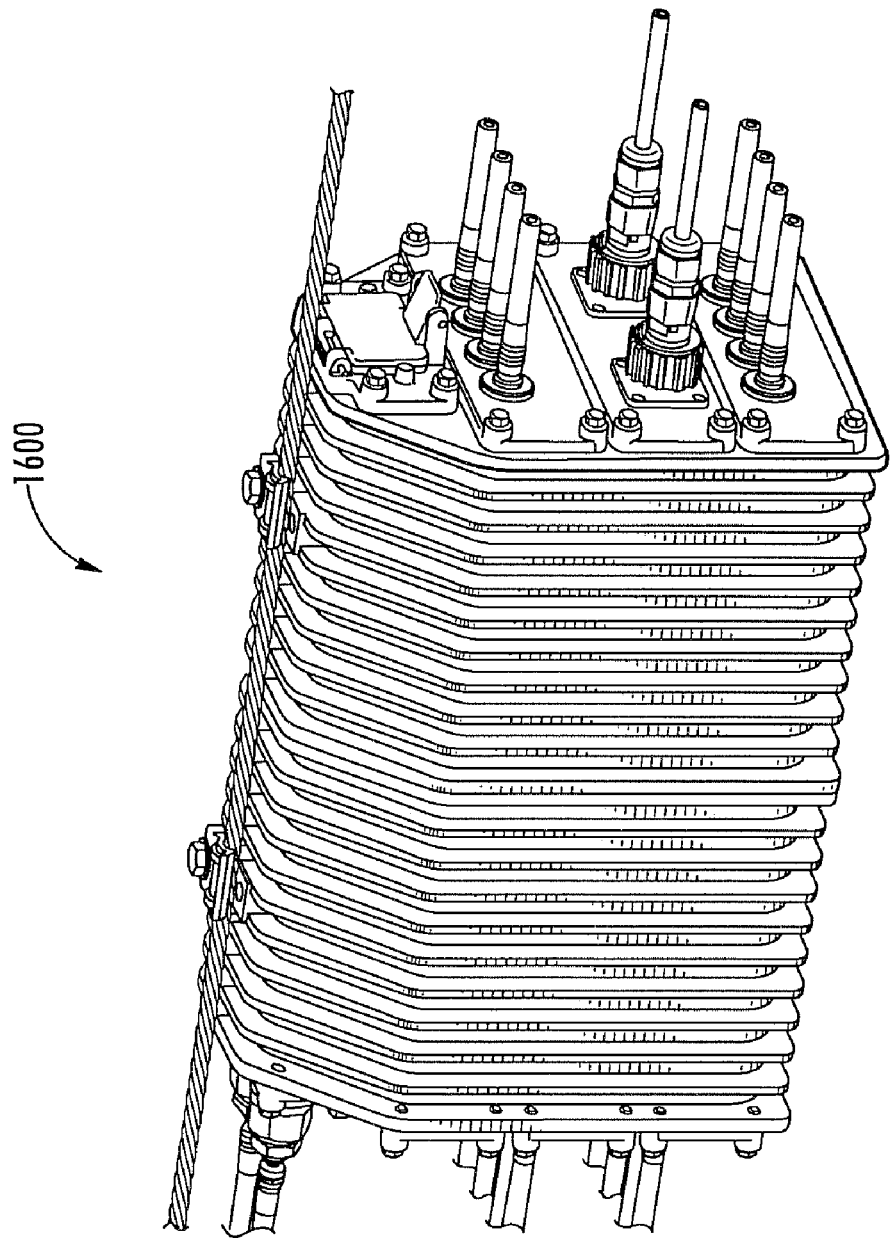
FIGS. 16-18 are perspective views of strand-mounted, wall-mounted, and pole-mounted switches according to an illustrative embodiment of the present invention.
Figure 17:
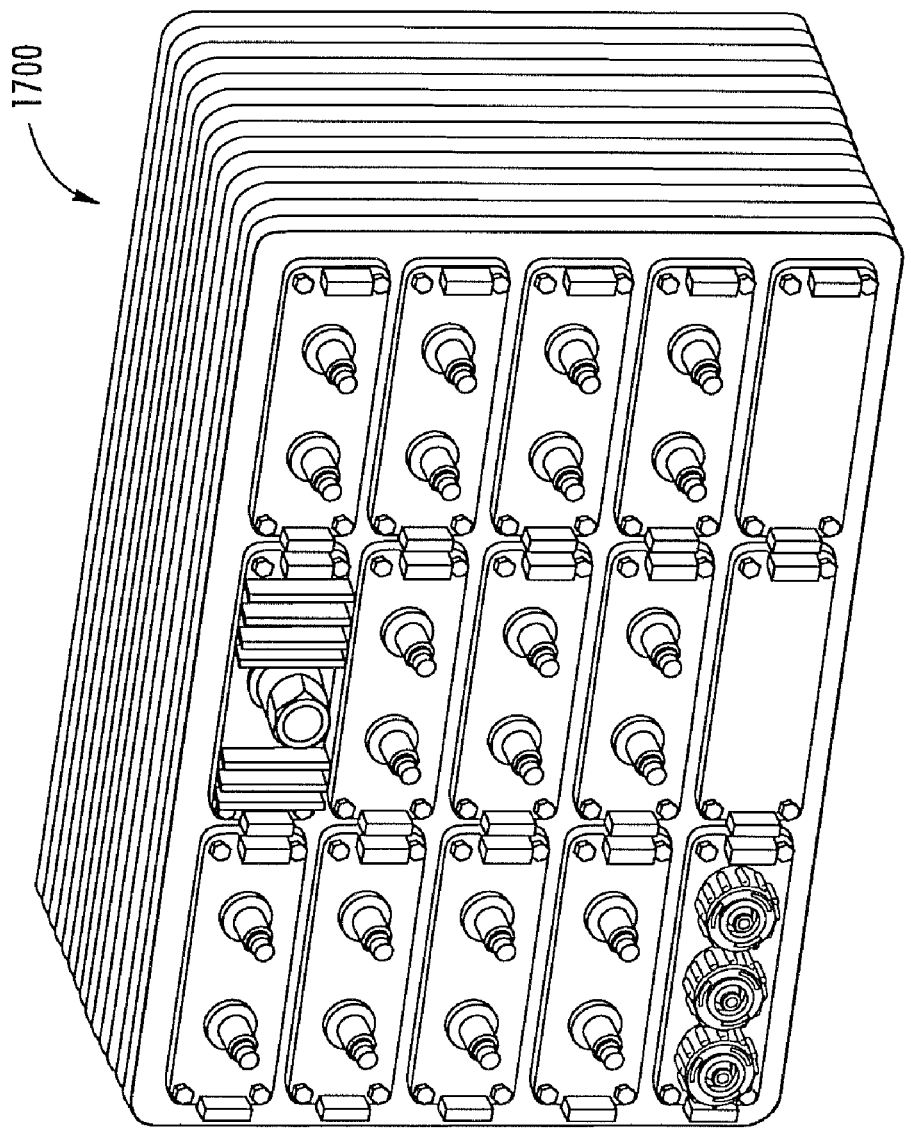
Figure 18:
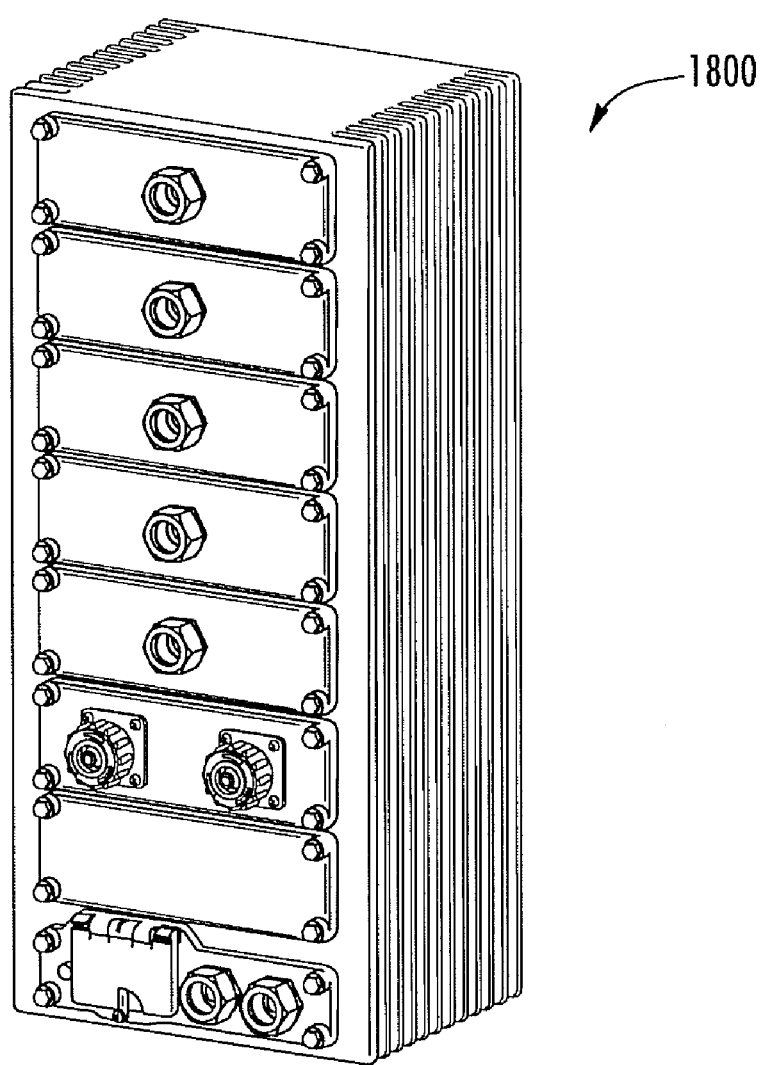

FIGS. 16-18 are perspective views of outdoor hardened exo-modular switches in some of its various housing form-factors according to illustrative embodiments of the present invention. The form-factors of the exo-modular switch include strand-mount 1600, wall/pedestal-mount 1700, pole-mount 1800, and rack-mount versions.

Since the intelligence of the exo-modular switch is contained in the many different types of modules, and since the outdoor environmental weather-sealing techniques are contained in a combination of the modules and the housing faceplates to which they are secured, and since the interconnection of modules is implemented by the mid-plane or backplane system, the actual shape and size of the housing can be flexibly designed to suit various environmental uses and shapes. The techniques contained in the modules, weather-sealing, and interconnection can be replicated in different form factors.

Figure 19:
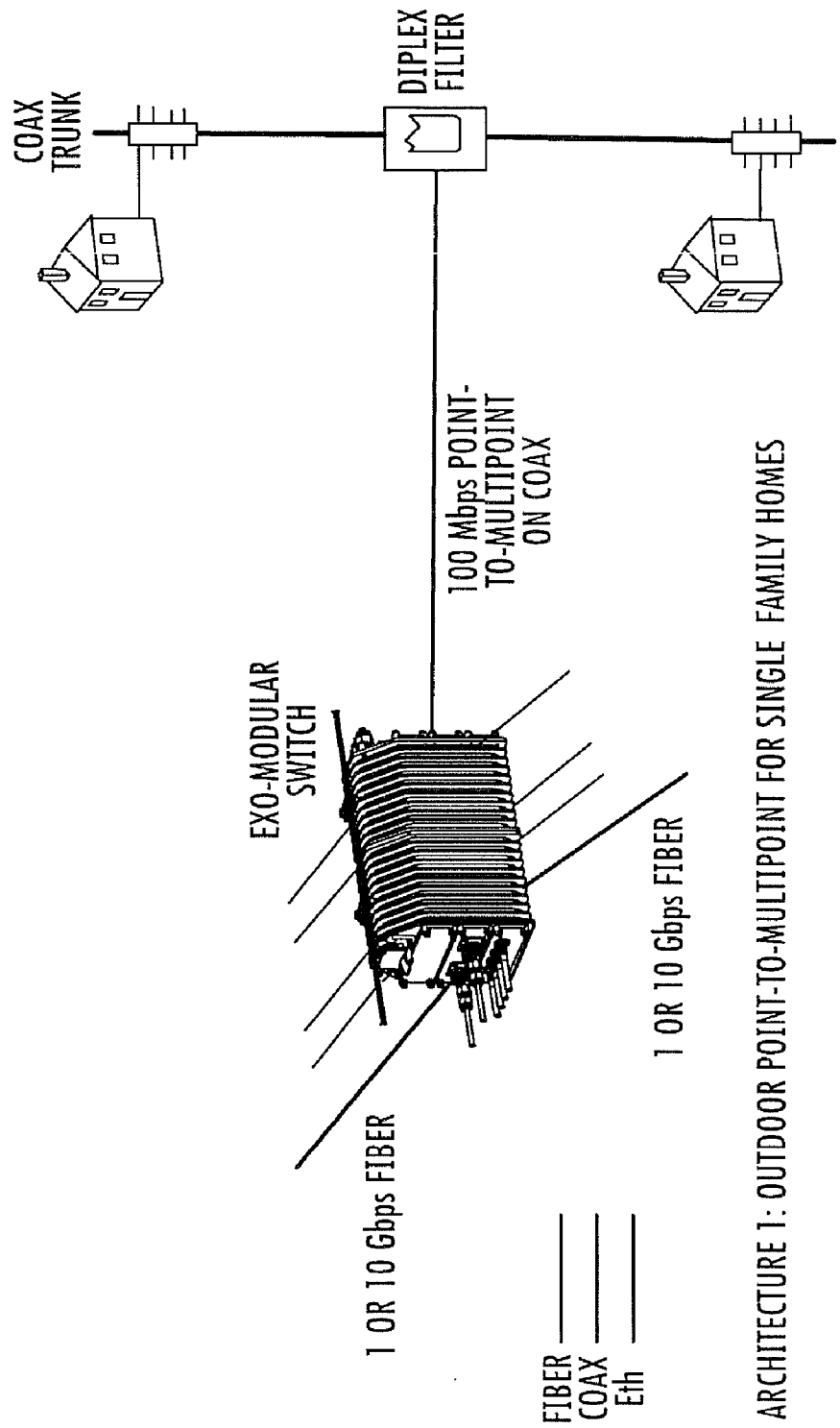
FIG. 19 is a conceptual diagram of an exemplary network architecture including outdoor point-to-multipoint nodes for residential homes according to an illustrative embodiment of the present invention.

FIG. 19 is a conceptual diagram of an exemplary network architecture including outdoor point-to-multipoint nodes for residential homes according to an illustrative embodiment of the present invention. FIG. 19 shows an outdoor access network where fiber optic cable is feeding bi-directional bandwidth capacity to an exo-modular switch, which in turn is providing point-to-multipoint data over coaxial cable that is diplexed onto an existing coax trunk to serve single family homes.

Figure 20:
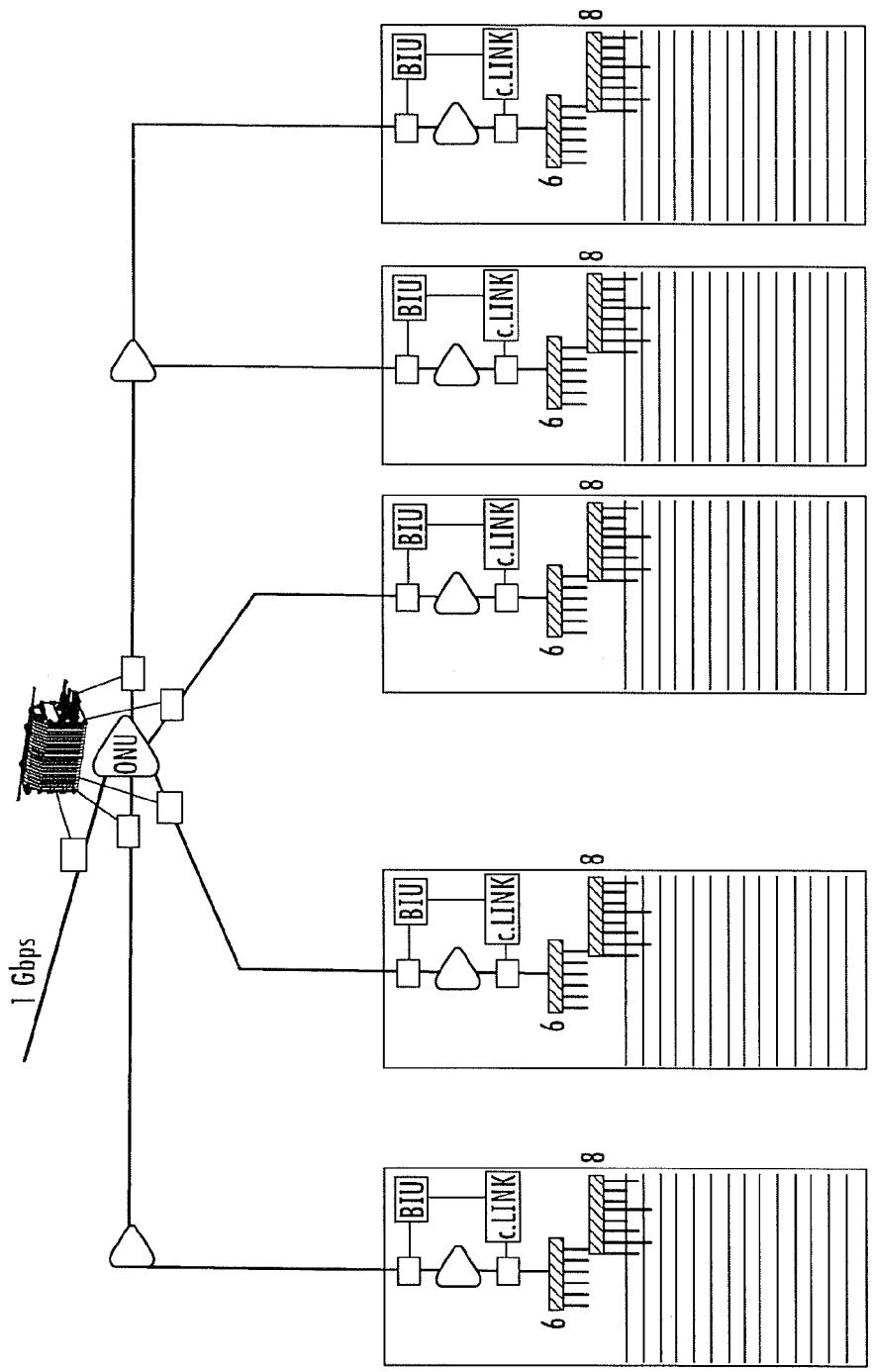
FIG. 20 is a conceptual diagram of an exemplary network architecture including outdoor Ethernet over coaxial cable feeding indoor point-to-multipoint connections according to an illustrative embodiment of the present invention.

FIG. 20 is a conceptual diagram of an exemplary network architecture including outdoor Ethernet over coax feeding indoor point-to-multipoint connections according to an illustrative embodiment of the present invention. FIG. 20 shows an outdoor access network where fiber optic cable is feeding bi-directional bandwidth capacity to an exo-modular switch, which in turn is providing point-to-point data over coaxial to an indoor media converter (BIU) which feeds Ethernet traffic to a point-to-multipoint network controller (cLink) which provides Ethernet over coax to customers in a multi-dwelling apartment building.

Figure 21:
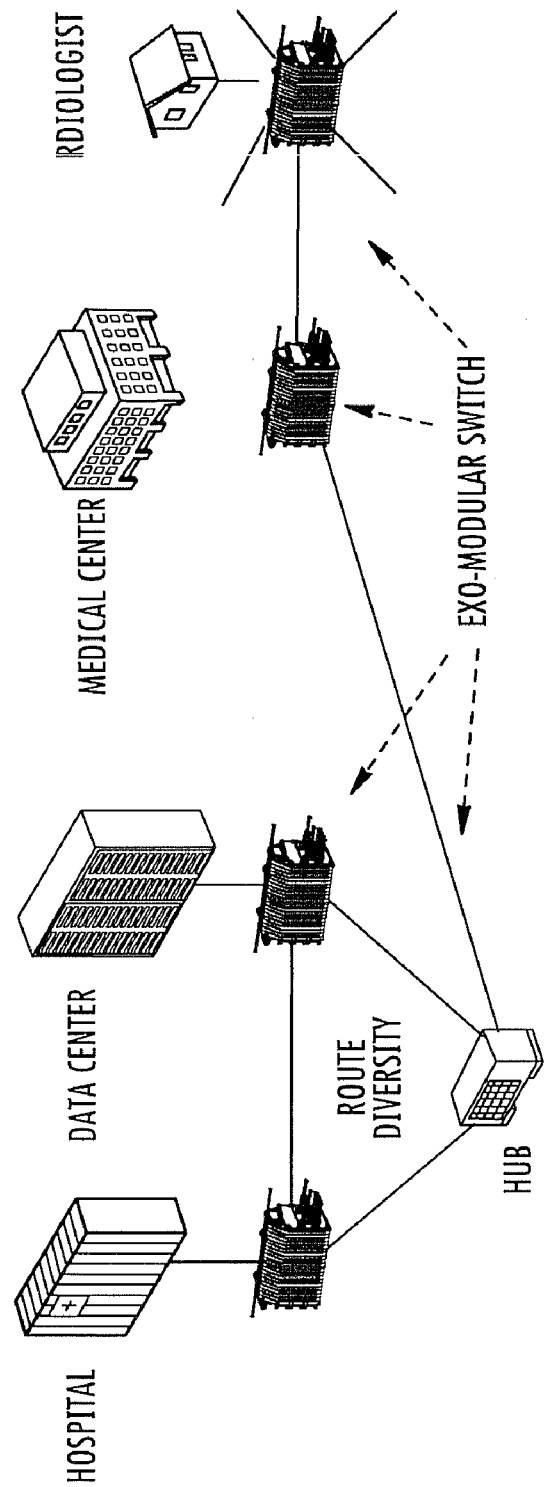
FIG. 21 is a conceptual diagram of an exemplary network architecture including outdoor point-to-point connections for dedicated access and/or enterprise services according to an illustrative embodiment of the present invention.

FIG. 21 is a conceptual diagram of an exemplary network architecture including outdoor point-to-point connections for dedicated access and/or enterprise services according to an illustrative embodiment of the present invention. FIG. 21 shows an outdoor access network where fiber optic cable is feeding bi-directional bandwidth capacity to an exo-modular switch, which in turn is providing point-to-point data over fiber optic cable to multiple exo-modular switches, some of which are using route redundancy software to provide multiple paths to certain switches that are more sensitive to network availability and uptime. One of the exo-modular switches is converting fiber to coaxial to serve a single family home location that needs point-to-point dedicated bandwidth capacity (radiology office, in this example.)

Figure 22:
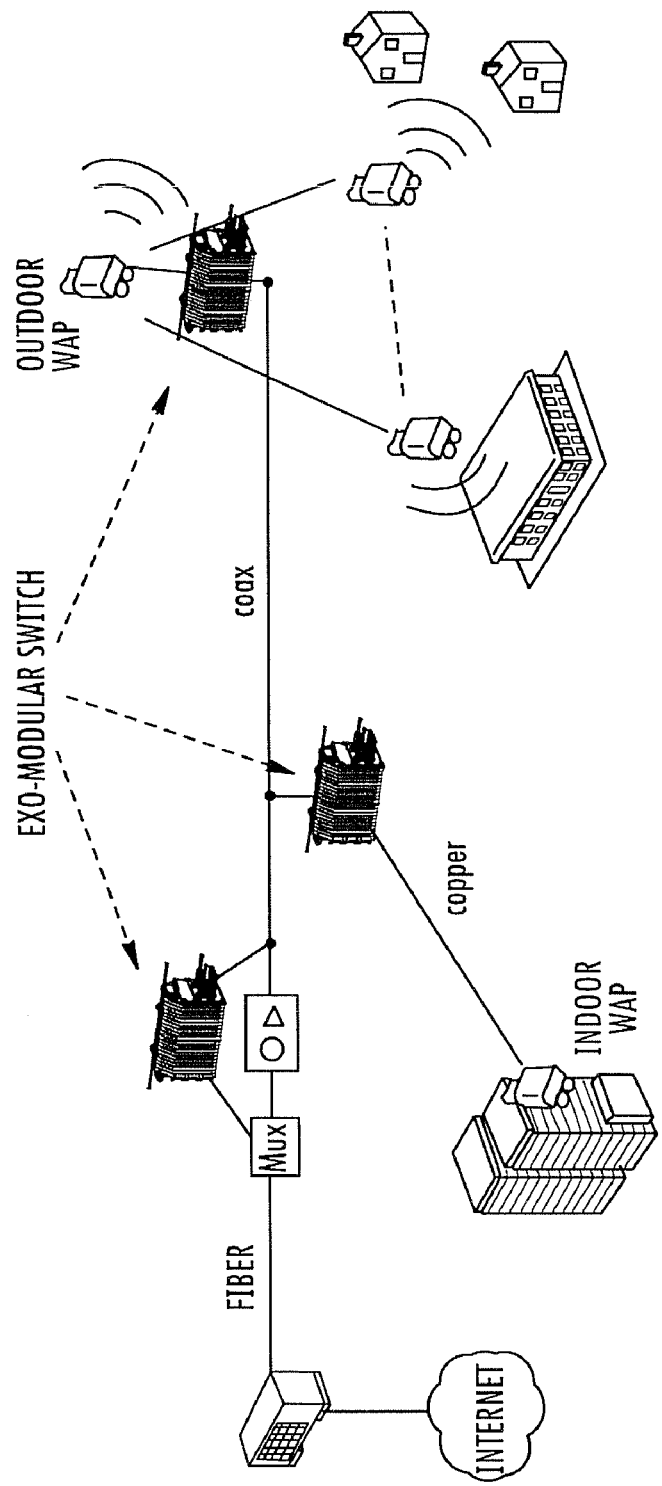
FIG. 22 is a conceptual diagram of an exemplary network architecture including outdoor point-to-point feeding wireless access points according to an illustrative embodiment of the present invention.

FIG. 22 is a conceptual diagram of an exemplary network architecture including outdoor point-to-point feeding wireless access points according to an illustrative embodiment of the present invention. FIG. 22 shows an outdoor access network where fiber optic cable is feeding bi-directional bandwidth capacity to an exo-modular switch, which in turn is providing point-to-point data over coaxial cable to multiple exo-modular switches, which are converting Ethernet over coaxial to Ethernet over copper to feed bi-directional bandwidth capacity to outdoor wireless access points.

Figure 23:
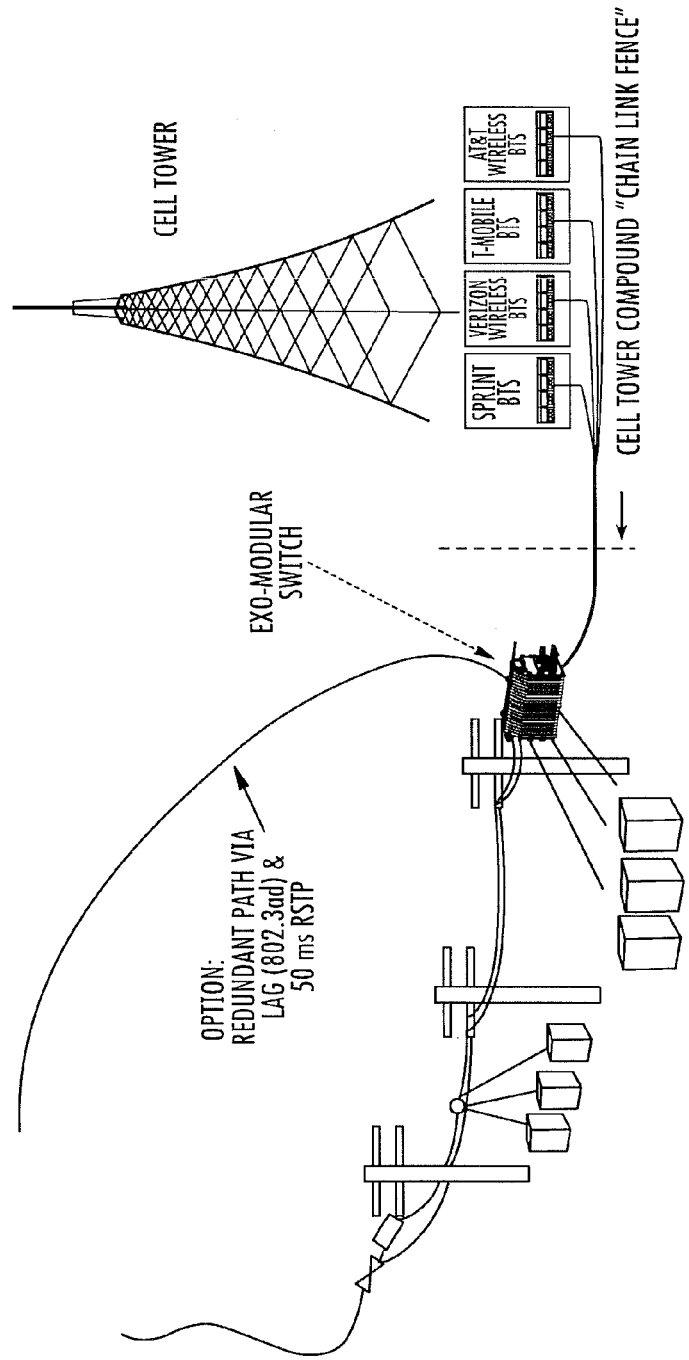
FIG. 23 is a conceptual diagram of an exemplary network architecture including outdoor point-to-point connections for cellular telephone and/or wireless tower backhaul according to an illustrative embodiment of the present invention.

FIG. 23 is a conceptual diagram of an exemplary network architecture including outdoor point-to-point connections for cellular telephone and/or wireless tower backhaul according to an illustrative embodiment of the present invention. FIG. 23 shows an outdoor access network where fiber optic cable is feeding bi-directional bandwidth capacity to an exo-modular switch, which in turn is providing point-to-point data over fiber or coaxial cable to single family homes and also point-to-point dedicated bi-directional bandwidth capacity via fiber-optic cable to multiple cellular switches located at a cell tower. The bandwidth capacity supplied to the cell tower can be Ethernet bandwidth or time-division-multiplexed capacity, such as a T1 line.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. An outdoor data distribution device, comprising:
    a first exo-modular data module, comprising:
        at least two data ports, each data port being externally accessible to allow manual connecting or disconnecting to one or more network transport mediums,
        at least two transceivers for exchanging data with the two data ports,
        at least two converters, each converter communicating with each transceiver respectively for converting the data to or from packet data,
        a data switch, in communications with the at least two converters for inspecting and routing data packets between data ports,
        a processor in communication with the data switch that controls the data switch,
    an exterior housing that is sealed and environmentally hardened to protect at least one of the data switch, the processor, converters, and transceivers, from exposure to the outdoor environment,
    a mid-plane connector for allowing one or more exo-modular modules to be inserted or removed from either side of a two-sided exterior housing,
    wherein the one or more exo-modular modules may be added to and protected by or removed from the exterior housing via exterior access without interrupting the operation of other modules, and wherein the exo-modular modules are configured to form a weather-tight seal with the exterior housing.

2. The device of claim 1, further comprising a first power module for extracting AC or DC power from an external power source, the power module supplying the other modules in the device through the mid-plane connector.

3. The device of claim 2, further comprising a power input connector in communication with independently power supplies of claim 2, allowing exo-modular power supplies to be inserted or removed from the device without disconnecting power supply cables.

4. The device of claim 1, further comprising a plurality of power modules, each for accepting power from a different external power source, the plurality of power modules substantially equally sharing the power consumption from the different external power sources.

5. The device of claim 1, further comprising at least two power modules, each module being connectable or removable while at least one other power module provides continuous power to the device.

6. The device of claim 1, further comprising means for allowing switch modules, transmission port modules, or power modules to be inserted or removed while input supply power is connected to the device.

7. The device of claim 1, further comprising a maintenance port with status indicators allowing installers to visually determine operational status of the device and any module in inserted in the device.

8. The device of claim 7, wherein the maintenance port is behind an environmentally sealed cover.

9. The device of claim 7, wherein the maintenance port is connected to a wireless transceiver that can transmit status of the device or any module and can receive maintenance commands to be interpreted by the processor.

10. The device of claim 1, further comprising at least one of a built-in or exo-modular Global Positioning System (GPS) that allows the device to be tracked, an exo-modular fiber optic transceiver port, and an exo-modular coaxial cable transceiver port.

11. The device of claim 1, further comprising at least one of an exo-modular ADSL, ADSL-2, VDSL, and VDSL-2 port.

12. The device of claim 1, further comprising at least one of an exo-modular wireless radio module with antenna connectors, an exo-modular Ethernet module, and an exo-modular Ethernet module supplying power-over-Ethernet (POE), an exo-modular layer 2 Ethernet switch module, an exo-modular layer 3 Ethernet switch module, and an exo-modular power supply module.

13. The device of claim 1, further comprising an exo-modular keying system for mechanically preventing modules from being inserted into improper module slots.

14. The device of claim 1, further comprising exo-modular modules that are physically connected to the device housing with positive-stop bolts that capture o-rings at a compression that seals each module to the housing, preventing environmental ingress or egress between the module and the housing.

15. The device of claim 1, further comprising exo-modular modules using a two-stage removal system, the first removal stage including a latch-stop requiring manual release of a latch to fully remove the module from the housing.

16. The device of claim 1, wherein the device communicates with a topology server through one or more of its transmission ports for auto-discovery and auto-configuration.

17. The device of claim 1, wherein the device communicates its status to a central management server.

18. The device of claim 1, wherein the device generates a removal alarm at a central monitoring server when the device or any of its exo-modular modules are removed.

19. The device of claim 1, wherein the device is placed in a maintenance state so that removal of the device or any of its exo-modular modules will not generate a removal alarm.

20. The device of claim 1, wherein the device uses an optional backplane connector system.

21. The device of claim 1, wherein the device is an exo-modular switch module that can support combinations of OSI layer 2, layer 3, and layer 4 protocols.

22. The device of claim 1, further comprising exo-modular option modules for optical transmission using gigabit interface connectors (GBIC), small form factor pluggable (SFP) connectors.

23. The device of claim 1, further comprising software that implements route redundancy to allow more than one medium to provide connectivity to the exo-modular switch in the event that one of the bandwidth input sources experiences a failure.

24. The device of claim 1, further comprising an optional exo-modular TDM module supplying T1 services over copper wire.

* * * * *